(12) United States Patent  (10) Patent No.: US 7,536,861 B2
Walpita  (45) Date of Patent: May 26, 2009

(54) SOLAR HEAT ENGINE SYSTEM

(75) Inventor: Nalin Walpita, Colombo (LK)

(73) Assignee: Solartrec Inc., Somerville, MA (US)

( * ) Notice: Subject to any disclaimer, the term of this patent is extended or adjusted under 35 U.S.C. 154(b) by 531 days.

(21) Appl. No.: 11/512,568

(22) Filed: Aug. 30, 2006

(65) Prior Publication Data

US 2007/0062195 A1  Mar. 22, 2007

Related U.S. Application Data

(60) Provisional application No. 60/719,328, filed on Sep. 21, 2005, provisional application No. 60/719,327, filed on Sep. 21, 2005.

(51) Int. Cl.
*F03G 6/00* (2006.01)

(52) U.S. Cl. .............. 60/641.11; 60/641.12; 60/641.15; 60/508; 60/650

(58) Field of Classification Search ................ 60/641.8, 60/641.11–641.15, 508, 517, 524, 525, 650
See application file for complete search history.

(56) References Cited

U.S. PATENT DOCUMENTS

| 659,450 | A | 10/1900 | McHenry | |
|---|---|---|---|---|
| 3,939,819 | A | 2/1976 | Minardi | 126/271 |
| 4,103,151 | A | 7/1978 | Chromie | |
| 4,144,716 | A | 3/1979 | Chromie | |
| 4,195,481 | A | 4/1980 | Gregory | 60/516 |
| 4,198,826 | A | 4/1980 | Chromie | |
| 4,209,983 | A | 7/1980 | Sokol | 60/325 |
| 4,229,076 | A | 10/1980 | Chromie | |
| 4,423,599 | A | 1/1984 | Veale | 60/641.8 |
| 4,471,617 | A | 9/1984 | De Beer | 60/641.11 |
| 4,601,170 | A | 7/1986 | Fiege | 60/513 |
| 4,636,325 | A | 1/1987 | Greene | 252/75 |
| 4,788,823 | A | 12/1988 | Johnston | 60/656 |
| 4,821,516 | A * | 4/1989 | Isshiki | 60/517 |
| 5,101,632 | A | 4/1992 | Aspden | 60/643 |
| 5,809,784 | A * | 9/1998 | Kreuter | 60/650 |
| 6,128,903 | A | 10/2000 | Riege | 60/641.8 |
| 6,272,855 | B1 | 8/2001 | Leonardi | 60/513 |
| 6,442,937 | B1 * | 9/2002 | Stone et al. | 60/641.11 |

(Continued)

FOREIGN PATENT DOCUMENTS

JP          8233373          9/1996

*Primary Examiner*—Hoang M Nguyen
(74) *Attorney, Agent, or Firm*—Lowrie, Lando & Anastasi, LLP

(57) ABSTRACT

The invention includes a solar collector subsystem and a heat engine. The solar collector system uses heliostat mirrors, a parabolic mirror, and a convex concentrator lens or compound parabolic concentrator to gather a large amount of solar energy into a very intense beam. The beam is used to vaporize an injected droplet of working fluid, whereby multiple opposed pistons responsive to the vapor formed reciprocate to produce electric energy by means of linear electric generators. The heat engine includes a chamber having three orthogonal sets of opposed pistons, wherein each piston is independently axially reciprocable and coupled to a linear electric generator. One piston is provided with an axially located window that admits the concentrated solar beam from the solar collector subsystem into the chamber of the heat engine. Another piston is provided with an injector that selectably injects a water drop into the center of the chamber where it can be vaporized by impingement of the concentrated solar beam.

20 Claims, 20 Drawing Sheets

U.S. PATENT DOCUMENTS

| | | | |
|---|---|---|---|
| 6,568,386 B2 | 5/2003 | Agata | 126/634 |
| 6,735,946 B1 * | 5/2004 | Otting et al. | 60/641.11 |
| 6,786,045 B2 | 9/2004 | Letovsky | 60/641.8 |
| 7,051,529 B2 * | 5/2006 | Murphy et al. | 60/641.8 |
| 7,084,518 B2 * | 8/2006 | Otting et al. | 290/1 R |
| 2004/0154299 A1 | 8/2004 | Appa et al. | 60/641.8 |

* cited by examiner

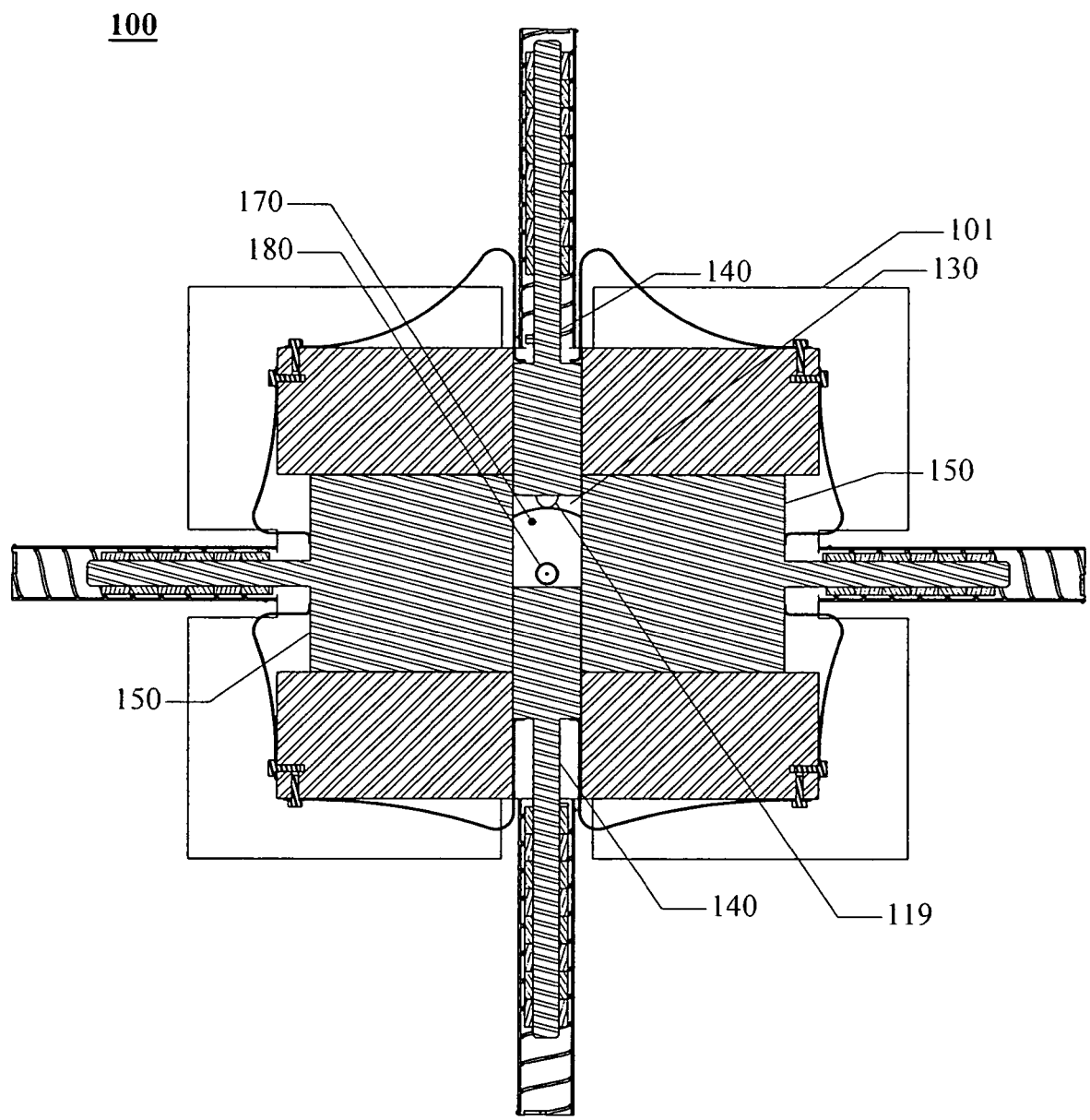

FIGURE 20
FIGURE 21
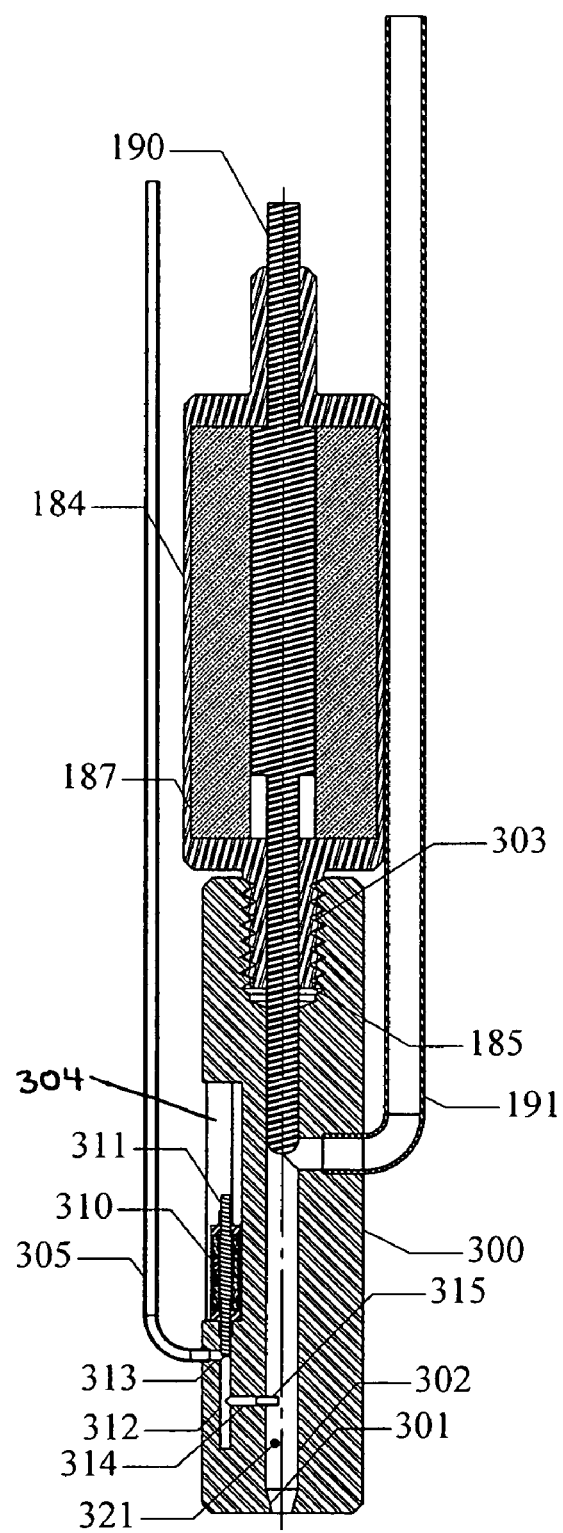
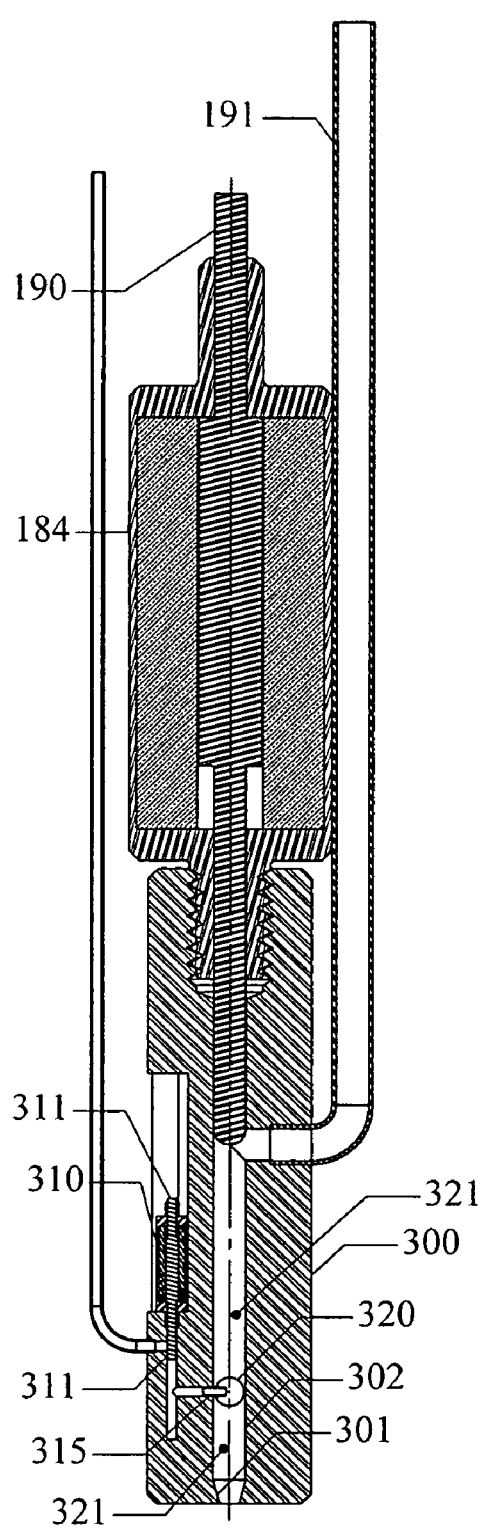

FIGURE 23
FIGURE 24
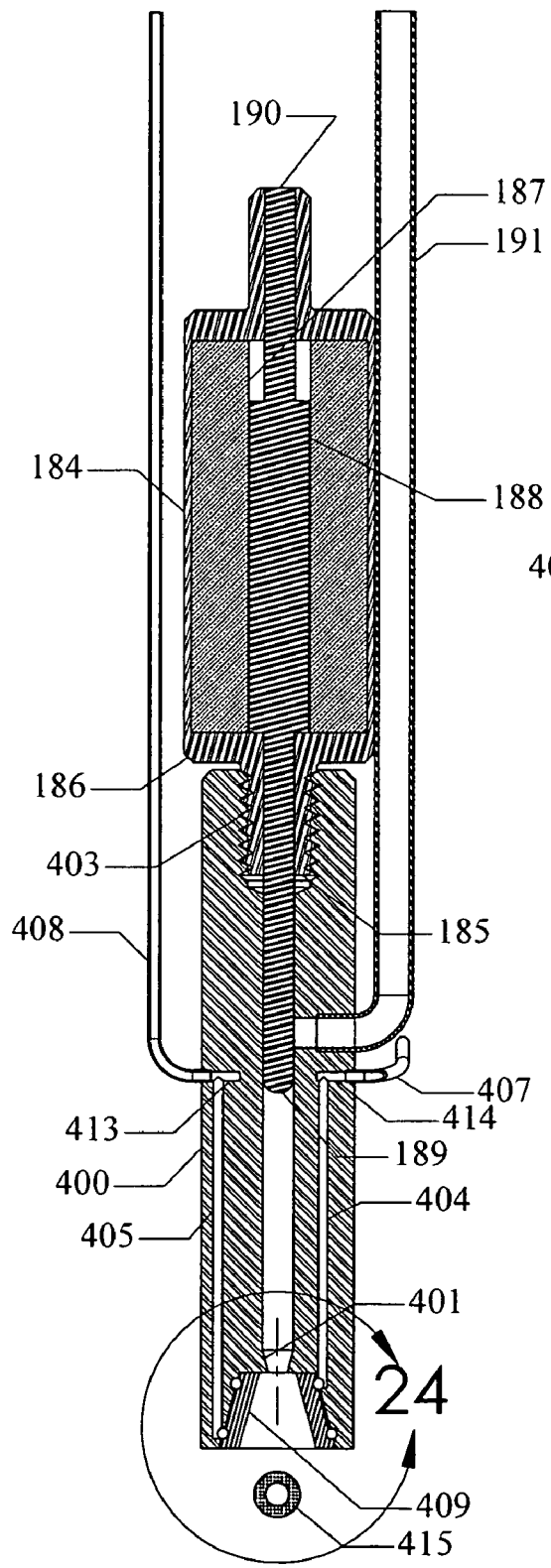
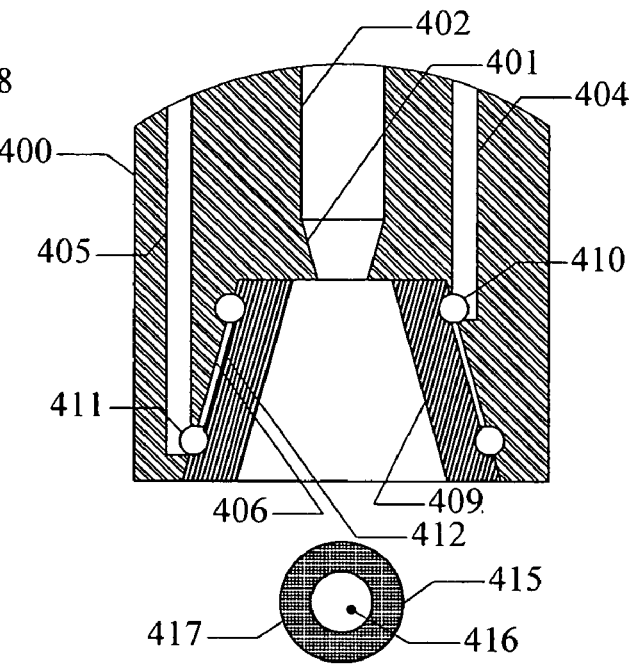

SOLAR HEAT ENGINE SYSTEM

CROSS REFERENCE TO RELATED APPLICATIONS

The present application, pursuant to 35 U.S.C. 111(b), claims the benefit of the filing date of provisional application Ser. No. 60/719,328 filed Sep. 21, 2005, and entitled "Solar Heat Engine System" and provisional application Ser. No. 60/719,327 filed Sep. 21, 2005, and entitled "Piezoelectric Selectably Rotatable Bearing."

BACKGROUND OF THE INVENTION

1. Field of the Invention

This invention relates in general to the production of power from solar energy. In particular, the present invention relates to a method and apparatus for the generation of electrical power using linear generators mounted on the multiple sets of opposed pistons of a motor using concentrated solar energy to create steam or other vapor as the working fluid.

2. Description of the Related Art

There has been an increased desire in the last few years to decrease dependence on fossil fuels. Solar energy has become a viable option because it is a clean energy source and there is almost an unlimited supply of solar radiation. It is estimated that the solar energy flux from the sun is approximately 2.7 megawatt-hours per square meter per year in certain areas of the world. Thus, over the last few years there have been numerous technical innovations for improving the generation of electrical power from solar energy.

There is a continuing need to improve the means for converting solar power into electrical power.

SUMMARY OF THE INVENTION

The present invention relates in general to a method and apparatus for concentrating of solar energy into a high energy beam and the subsequent use of such a beam to vaporize an injected droplet of working fluid by impingement with the beam, whereby multiple opposed pistons responsive to the vapor thereby formed reciprocate to produce electric energy by means of linear electric generators.

One aspect of the present invention is a solar generator system comprising: (a) a solar collector subsystem having (i) heliostat mirror or mirrors, (ii) a parabolic mirror, and (iii) a concentrator lens or hollow compound parabolic concentrator (CPC); and (b) a heat engine having (i) a chamber; and (ii) a plurality of axially reciprocable opposed piston pairs, each piston having a surface facing the chamber, wherein one piston has a window to admit a concentrated solar beam from the solar collector subsystem and one piston includes an injector that injects a fluid droplet into the chamber.

Another aspect of the present invention is a A solar generator system comprising: (a) a solar collector subsystem having (i) a parabolic mirror, (ii) a plurality of heliostat mirrors positioned to reflect incident sunlight to the parabolic mirror, and (iii) a concentrator lens or hollow compound parabolic concentrator (CPC) aligned to receive a reflected light beam from the parabolic mirror, the concentrator lens or CPC concentrating the reflected light beam to produce a concentrated solar beam; and (b) a heat engine having (i) a chamber, (ii) a plurality of axially reciprocable opposed piston pairs, each piston having an interior surface facing the chamber and responsive to pressure within the chamber, wherein one piston has a window to admit a concentrated solar beam from the solar collector subsystem and one piston includes an injector that injects a fluid droplet into the chamber, (iii) an electric generator associated with each piston such that electricity is generated whenever the pistons reciprocate between an inner position and an outer position; (iv) a return means for returning the pistons from the outer position to the inner position, and (v) an exhaust vent, wherein the exhaust vent opens whenever at least one pair of pistons are in the outer position; and (c) a shutter assembly having a selectably open/closed slot, wherein the open slot is aligned to admit the concentrated solar beam through the open slot and into the piston window of the heat engine and the closed slot reflects the concentrated solar beam away from the heat engine.

Yet another aspect of the present invention is a method for converting solar energy into electrical energy, the method comprising the steps: (a) directing incident solar radiation impinging on a plurality of heliostat mirrors to a parabolic mirror; (b) reflecting a light beam from the parabolic mirror to a concentrator lens or CPC; (c) concentrating the light beam to a concentrated beam; (d) directing the concentrated beam into a chamber of a heat engine having a plurality of axially opposed piston pairs, each piston having a surface facing the chamber, wherein one piston has a window to admit the concentrated beam into the chamber and one piston includes an injector; (e) injecting a droplet of working fluid into the chamber; (f) impinging the fluid droplet with the concentrated beam to vaporize the working fluid in the chamber; (g) reciprocating the pistons in response to the working fluid vapor; and (h) generating electricity by a set of generators associated with the reciprocating pistons.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 12 corresponds to FIG. 11.

FIG. 15 is a transverse cross-sectional view corresponding to FIGS. 11 and 13, but with all the pistons of the engine fully returned to their positions shown in FIGS. 11 and 12 with the exception of the upper small piston. The motion of the upper small piston has been retarded in order to permit exhausting the water vapor within the engine preparatory to another power stroke.

FIG. 20 is a longitudinal sectional view of a first alternative injector that can inject a water droplet with an internal air bubble. The first alternative injector is shown in its position prior to initiation of injection.

FIG. 21 corresponds to FIG. 20, but shows an air bubble being injected into the water in the injector as an initial injection step.

FIG. 23 shows a second alternative injector that produces a frozen shell on its injected droplet. This second alternative injector is shown with its droplet exiting the injector.

FIG. 24 is an enlarged view of the injector nozzle end of the injector of FIG. 23 showing the injector and the injected droplet in more detail.

DESCRIPTION OF THE PREFERRED EMBODIMENTS

The present invention comprises a solar collector subsystem and a heat engine. The solar collector system uses heliostat mirrors, a parabolic mirror, and a convex concentrator lens to gather a large amount of solar energy into a very intense beam. The heat engine includes a chamber having three orthogonal sets of opposed pistons, wherein each piston is independently axially reciprocable and coupled to a linear electric generator. One piston is provided with an axially located window that admits the concentrated solar beam from the solar collector subsystem into the chamber of the heat engine. Another piston is provided with an injector that selectably injects a water drop into the center of the chamber where it can be vaporized by impingement of the concentrated solar beam.

The Solar Collector Subsystem

Figure 1:
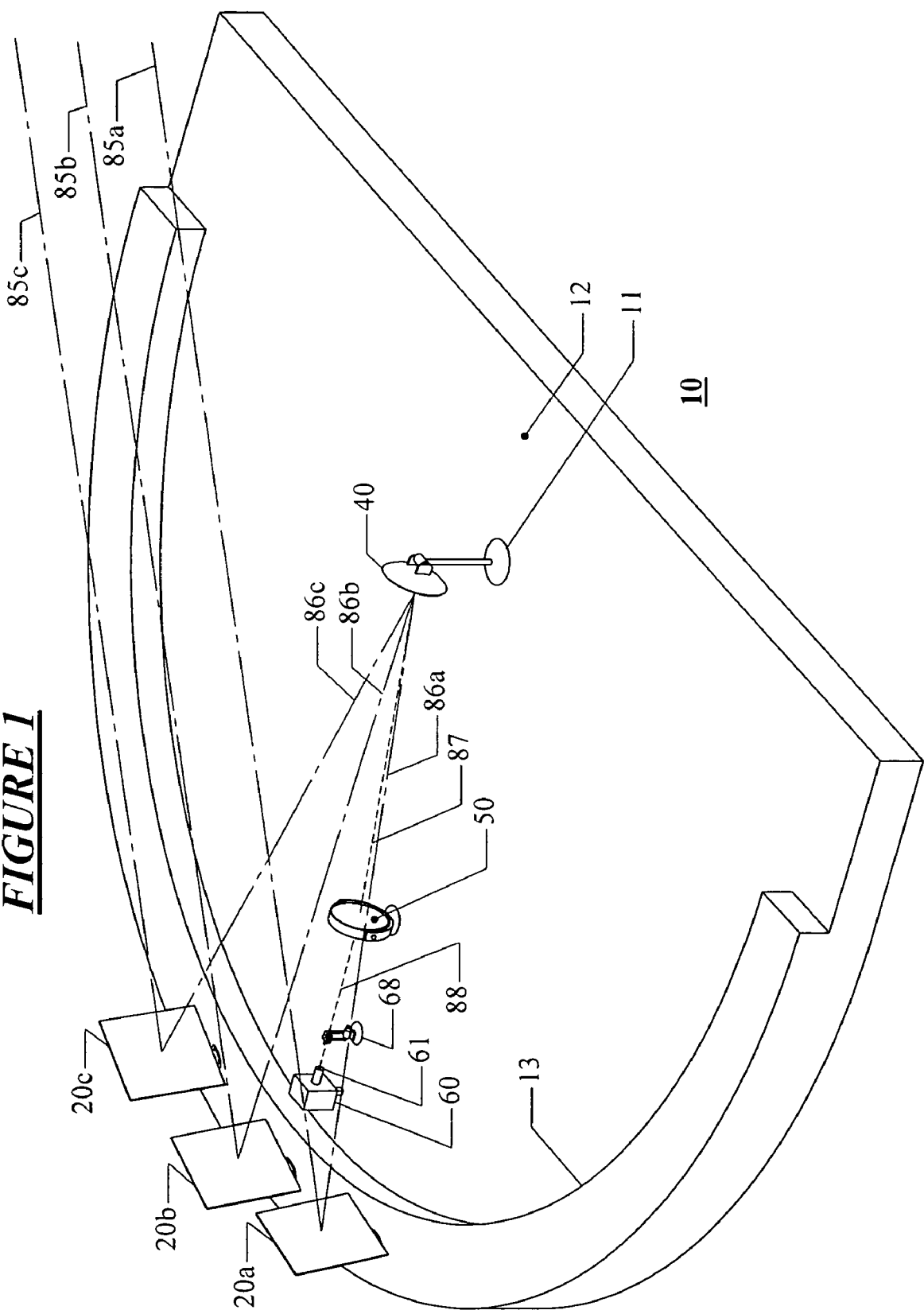
FIG. 1 is a view showing the relationship of the solar collector subsystem to the heat engine system of the present invention.

Referring to FIG. 1, the solar heat engine system 10 is shown. The heat engine 100 of the system 10 is housed within the engine mounting box 60 of the solar collector subsystem 11. A flat, approximately semicircular base 12 is provided with a semicircular raised berm 13 at its outer periphery. The plane of symmetry for the base 12 extends in a roughly north-south direction, with the berm 13 located on the north side in the northern hemisphere and the south side in the southern hemisphere.

Spaced along the berm are multiple flat heliostat mirror systems 20a,b,c. Preferably, the mirror systems are substantially identical but they can be individually varied to optimize operation. The mirror systems 20 are automatically controlled to independently rotate about both a vertical axis and a horizontal axis parallel to the mirror reflective face. Each mirror system 20 is caused to track the sun in a manner such that sunlight incident upon the mirror is reflected to parabolic mirror 40 located at the center of the semicircular berm 13.

Although not required, the parabolic mirror 40 is typically a conventional construction such as is commonly utilized for solar energy installations. The mirror 40 is mounted on an adjustable base and is aligned in a roughly north-south orientation facing the reflective surfaces of the heliostat mirrors 20. As shown in FIG. 1, incident sunbeams 85a,b,c respectively impinge heliostat mirrors 20a,b,c so that reflected beams 86a,b,c converge upon the parabolic mirror 40. The reflected beams 86a,b,c are in turn reflected by the parabolic mirror 40 as beam 87, which is directed at the convex concentrator lens 50. Concentrator lens 50 is preferably of glass construction and is mounted on the north-south plane of symmetry of the base 12. The concentrated solar energy of beam 87 is further concentrated into a very narrow, intense beam 88 by concentrator lens 50. The concentrator lens may be replaced by a hollow compound parabolic concentrator or CPC, which is internally coated with a reflecting surface. It has exactly the same function as the concentrating lens.

Following passage through the concentrator lens 50, the beam 88 encounters a shutter assembly 68. The shutter assembly is of rotary construction and has a diffusing slightly convex mirrored surface on its side adjacent the concentrator lens 50. An arcuate slot is provided in the face of the shutter 68, so that when the slot is rotated into proper alignment with the beam 88, the beam passes through the slot. When the slot is out of alignment with the beam, the beam 88 is reflected and diffused.

The engine mounting box 60 is mounted on the foundation 12 on the north-south plane of symmetry of the base with its light entry port 61 oriented coaxially with the intense beam 88 emerging from the concentrator lens 50. The heat engine 100, shown in detail in FIGS. 3 to 18, is mounted inside engine box 60 so that intense beam 88 can enter the chamber of the engine 100.

Figure 2:
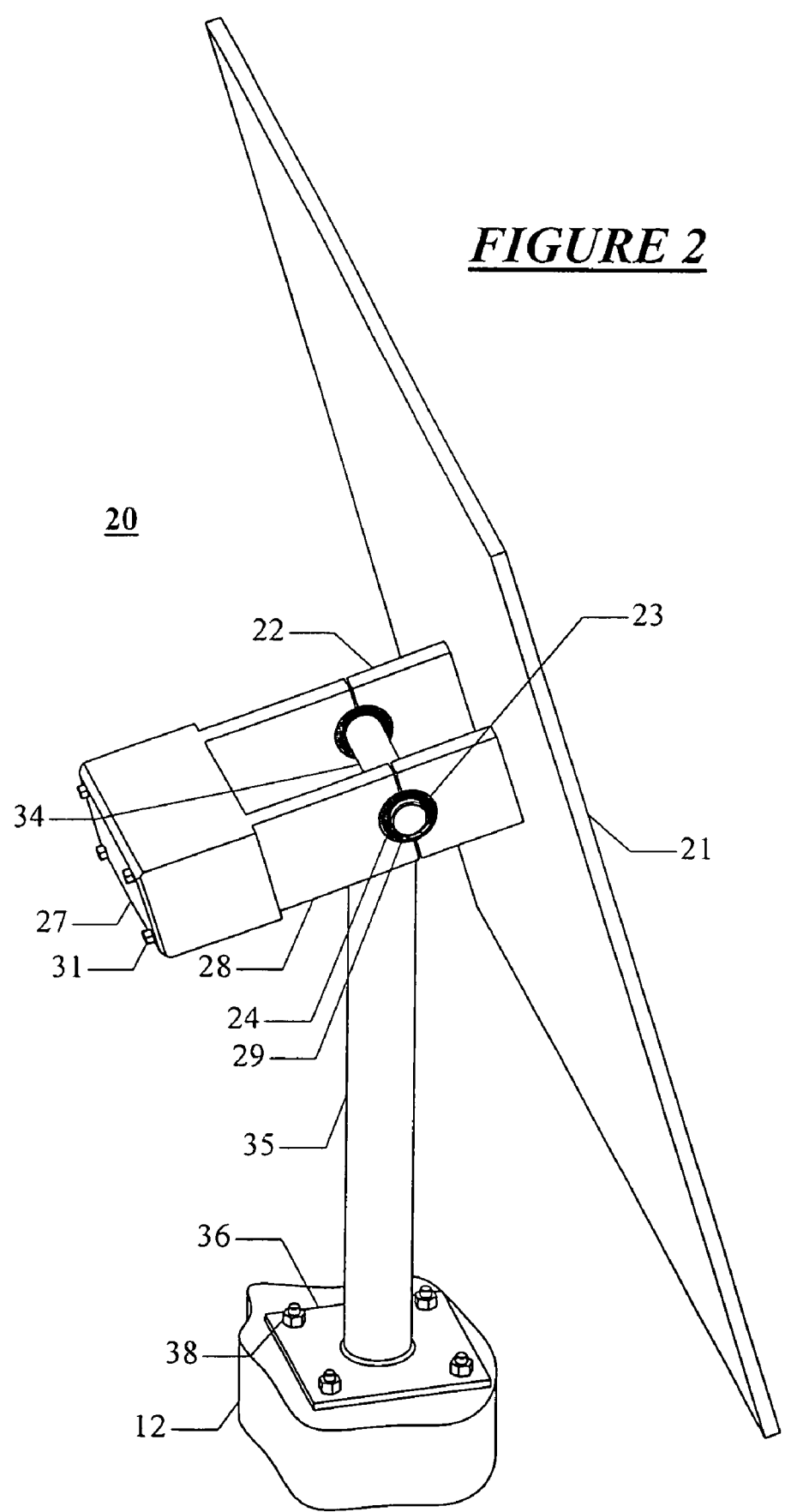
FIG. 2 shows an oblique view of the selectably positioned mirror assembly of the solar collector subsystem.

The structure of the heliostat mirror systems 20 is shown in FIG. 2. The adjustable heliostat mirror system 20 consists of a flat, rectangular, metal mirror plate 21 having one face highly polished so that it is sufficiently reflective to serve as a mirror. The face of mirror plate 21 opposed to the reflective face has two symmetrically spaced-apart parallel vertical rectangular mounting brackets 22 projecting outwardly in its center. Each bracket 22 has a circular arcuate recess 23 of slightly less than 180° are length at its distal end. The recesses 23 are coaxial, parallel to the mirror face of mirror plate 21, and lie in the horizontal plane of symmetry of plate 21. The recesses 23 are a close fit to the cylindrical outer races of self-actuating roller bearings 24. The distal ends of the brackets 22 have a symmetrically positioned pattern of drilled and tapped holes normal to the plane of the mirror plate 21.

Preferably, self-actuating roller bearings 24 are used to move the mirror plate 21. One embodiment of such a self-actuating roller bearing 24 is described in detail in copending U.S. provisional patent application Ser. No. 60/719,327 that is hereby incorporated herein in its entirety. The self-actuating roller bearing 24 is a modification of a conventional roller bearing, wherein the bearing is provided with a selectably operable driving means which can rotate the inner and outer races of the bearing in either direction and lock the bearing in a desired position. The driving means is mounted on a cylindrical support ring fixed to the outer race of the bearing.

Two opposed pawl systems constitute the driving mechanism of the driving means of the bearing. Each pawl system consists of a pawl element pivotably mounted to the support ring at its first end and having a transversely extending shoulder at its second end. The axis of the pivotable mount is parallel to the axis of the support ring. Intermediate to the length of the pawl element and offset to its outer side is a hinge hole in which a hinge pin is engaged. The hinge hole is parallel to the pivot mount at the first end of the pawl element. A link element is pivotably mounted at its first end on the support ring on an axis parallel to but offset from the pivotable mount of the pawl element. The link element is pivotably mounted at its second end to the offset pin on the pawl element. Both the pawls and the links are made of piezoelectric materials so that those elements may be caused to lengthen from their at rest state when a voltage is selectably applied across their length.

The rotary motion of the bearings 24 is done in finite increments by using opposed selectably extensible and retractable piezoelectric pawls which are selectably engaged in ratchet teeth provided on the exterior of the inner race. Applying a bias voltage to a pawl will cause it to lengthen. When the pawl is engaged with a tooth of the inner race, lengthening of the pawl will cause relative rotation of the inner and outer races of the bearing.

A piezoelectric pawl is selectably engaged with and disengaged from the teeth of the inner race by using its piezoelectric link to pivotably lift the transverse shoulder of the second end of the pawl element when the biasing voltage is removed from the link and to urge the pawl shoulder into engagement with the teeth of the inner race when the biasing voltage is applied. Thus, the driving mechanism of the self-actuating roller bearing 24 can be used in a hand-over-hand manner to drive and then lock the bearing in a new position by means of selectably applying and removing biasing voltages to the pawl and link elements of the bearing driving means.

Counterweight 27 consists of a right rectangular prismatic bar having two symmetrically spaced-apart parallel vertical rectangular mounting brackets 28 projecting outwardly in its center. The spacing of the brackets 28 is similar to that of the brackets 22 of the mirror plate 21. Each bracket 28 has a circular arcuate recess 29 of slightly less than 180° arc length at its distal end. The recesses 29 are coaxial, parallel to the face supporting the brackets 28, and lie in the horizontal plane of symmetry of counterweight 27. The recesses 29 are a close fit to the cylindrical exteriors of self-actuating roller bearings 24.

A pattern of through holes corresponding to the drilled and tapped hole pattern in the brackets 22 of the mirror plate 21 is drilled through the counterweight 27 and its mounting brackets 28. Hex-headed mounting bolts 31 are inserted through the holes in counterweight 27 and threadedly engaged in the tapped holes in the ends of the brackets 22 of the mirror plate 21 so that each bearing 24 is rigidly gripped in its respective arcuate recess pair 23 and 29. The bores of the installed bearings 24 are horizontal, mutually coaxial, and located at the center of gravity of the assembled mirror plate 21 and its counterweight 27.

Tee bar 34 consists of a horizontal cross bar with an intersecting downwardly extending vertical shaft. The cross bar is a symmetrical right circular cylinder which is a press fit to the bores of the inner races of the self-actuated roller bearings 24 mounted to the mirror plate 21 and the counterweight 27. The vertical shaft of the tee bar 34 is press-fitted to a third, vertical axis self-actuating roller bearing 24.

The mounting pedestal for the adjustable heliostat mirror system 20 consists of a right circular cylindrical tubular post 35 having a counterbore at its upper end and a rectangular, centrally located, transversely mounted base plate 36 at its lower end. The base plate 36 has a regular pattern of vertical through holes by which the pedestal can be mounted to the base 12 of the solar collector subsystem 11 using an attachment means 38 such as a nut and bolt set. The third, vertical axis self-actuating roller bearing is press-fitted into the counterbore at the upper end of the post 35 of the pedestal.

Figure 19:
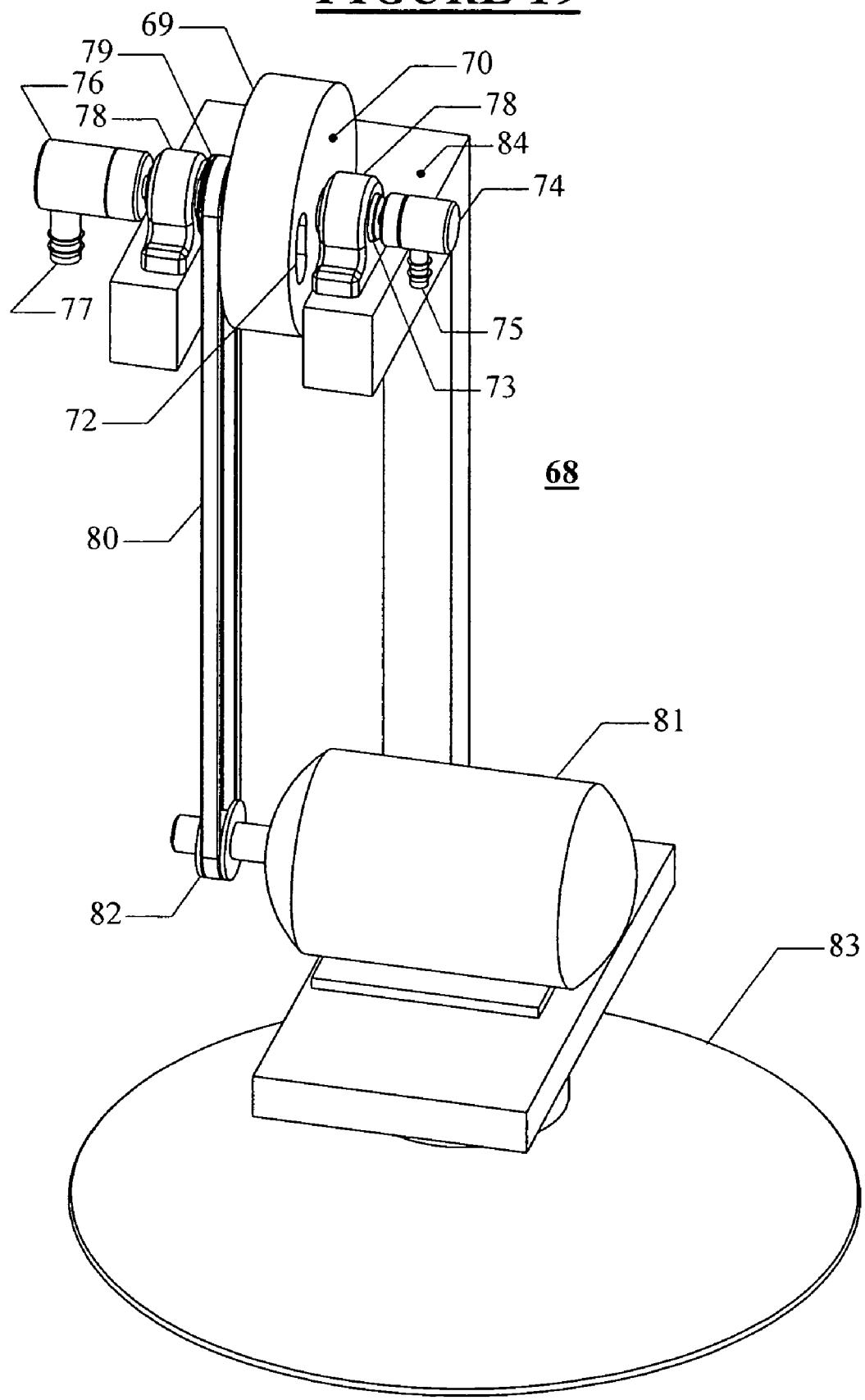
FIG. 19 is an oblique view of the shutter assembly of the solar collector subassembly.

The shutter assembly may be an independent construction such as shown in FIGS. 1 and 19, or the shutter assembly may be incorporated into the engine mounting box 60 in association with the light entry port. The function of the shutter assembly is to allow the concentrated light beam 88 to enter the light entry port 61 of the engine mounting box 60 whenever the shutter is open and to otherwise reflect and diffuse the beam 88 when the shutter is closed.

A preferred embodiment of the shutter assembly 68 is shown in an oblique view in FIG. 19. The function of the shutter assembly is to allow the concentrated light beam 88 to enter the light entry port 61 of the engine mounting box 60 whenever its arcuate shutter window 72 is aligned with the beam 88, but to otherwise reflect and diffuse the beam 88. The rotation of the shutter is synchronized with the injection of water droplets into the heat engine assembly 100 so that the energy of the concentrated solar beam 80 is available to the engine only when needed and is otherwise not impinging upon the engine. The provision of the shutter assembly 68 thereby avoids overheating of the internals of the engine when it is at stages of its operating cycle which do not require vaporization of the water droplets injected into its working chamber.

The shutter assembly 68 consists of a rotary shutter 69 which has a highly reflective slightly convex face 70 on its first side. The shutter 69 has a hollow cylindrical central body with a transverse second side and concentric right circular cylindrical shafts 73 projecting from both sides. The shutter 69 has a window 72 which penetrates through from its reflective first side 70 to its second side. The window 72 has a constant radius arcuate shape with rounded ends. The width of the arcuate window 72 is sufficient to fully pass the concentrated solar beam 88, and its arc length is selected to be sufficiently long to permit adequate solar energy to enter the working chamber of the heat engine 100 during the rotation of the shutter.

The shaft 73 on the first side of the shutter 69 has a concentric bore which extends inwardly to an intersecting radial hole which exits the shaft and communicates with the interior of the hollow shutter body. An inlet rotary swivel 74 having a radially projecting hose barb 75 is sealingly mounted into the external end of the bore of the shaft 73 on the first side of the shutter 69. The shaft 73 on the second side of the shutter 69 has a concentric bore which extends inwardly to an intersecting radial hole which exits the shaft and communicates with the interior of the hollow shutter body. An outlet rotary swivel 76 having a radially projecting hose barb 77 is sealingly mounted into the external end of the bore of the shaft 73 on the second side of the shutter 69.

Bearing pillow blocks 78 journal the external cylindrical portions of the shafts 73 of the shutter 69 so that it is rotatably supported. A sheave 79 is fixedly mounted to the shaft 73 between the transverse second face and the pillow block 78 on the second side of the shutter 69. The pillow blocks 78 and, hence, the shutter 69 is supported on the upper platform 84 of the horizontal shutter base 83. The rotational axis of the shutter is positioned horizontal and parallel to but offset from the vertical plane containing concentrated beam 88.

A drive motor 81 having an output motor sheave 82 mounted on its output shaft is mounted on a lower horizontal platform on the shutter base 83. A drive belt 80 is engaged on both the motor sheave 82 and the shutter shaft 73 so that the rotation of the motor is communicated to the shutter 69. The shutter base 83 has in sequential order from its lower end a horizontal base, a short vertical shaft extending to its horizontal motor support platform, an offset vertical pillar, and at its top the offset rectangular horizontal upper platform 84. A centrally located rectangular notch is cut transverse to the axis of mounting of the shutter 69 on the side of the upper platform 84 opposite the supporting vertical pillar of the shutter base 83. This notch accommodates the body of the shutter 69.

The Heat Engine

Figure 3:
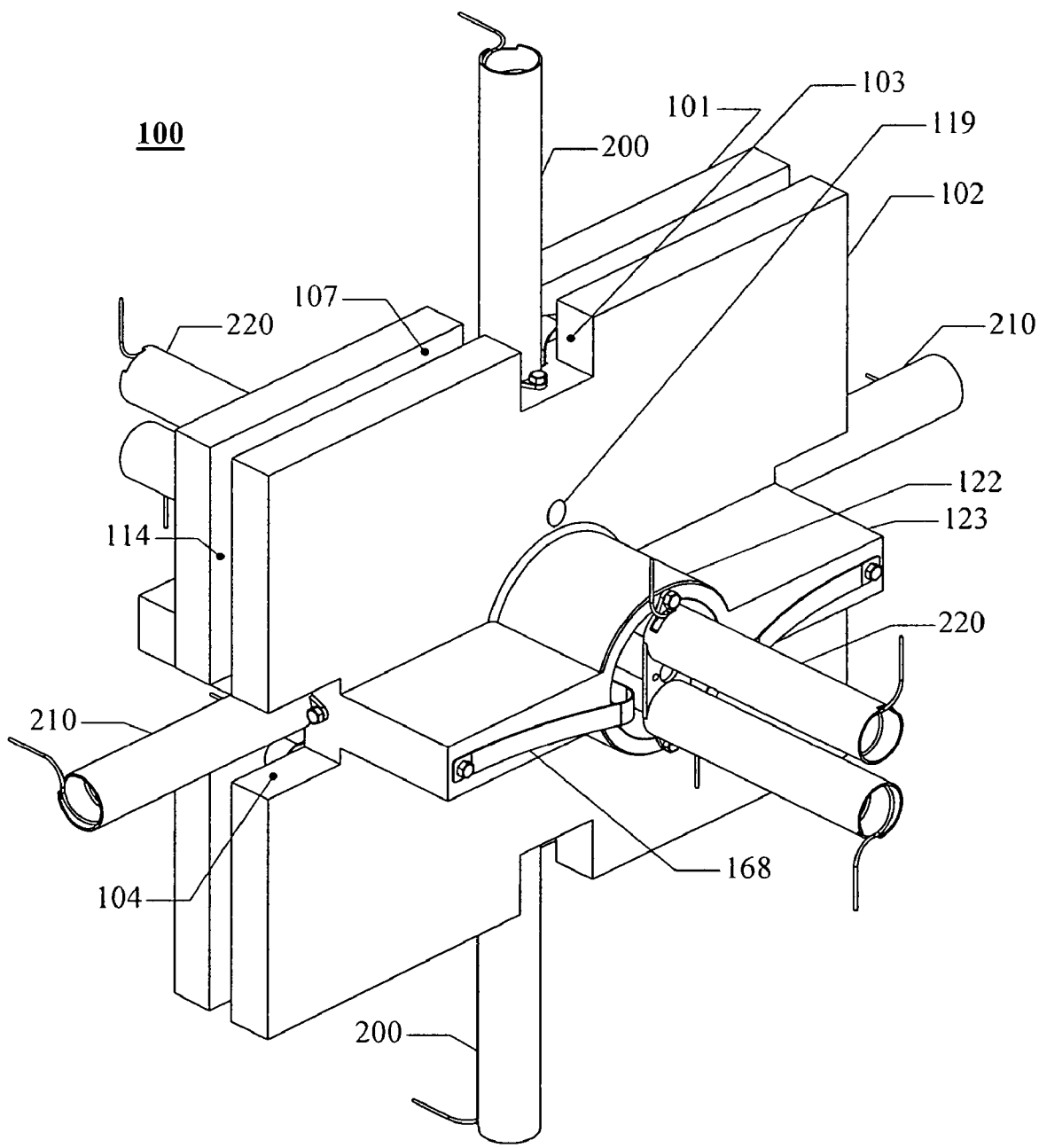
FIG. 3 is an oblique view of the heat engine system of the present invention.
Figure 4:
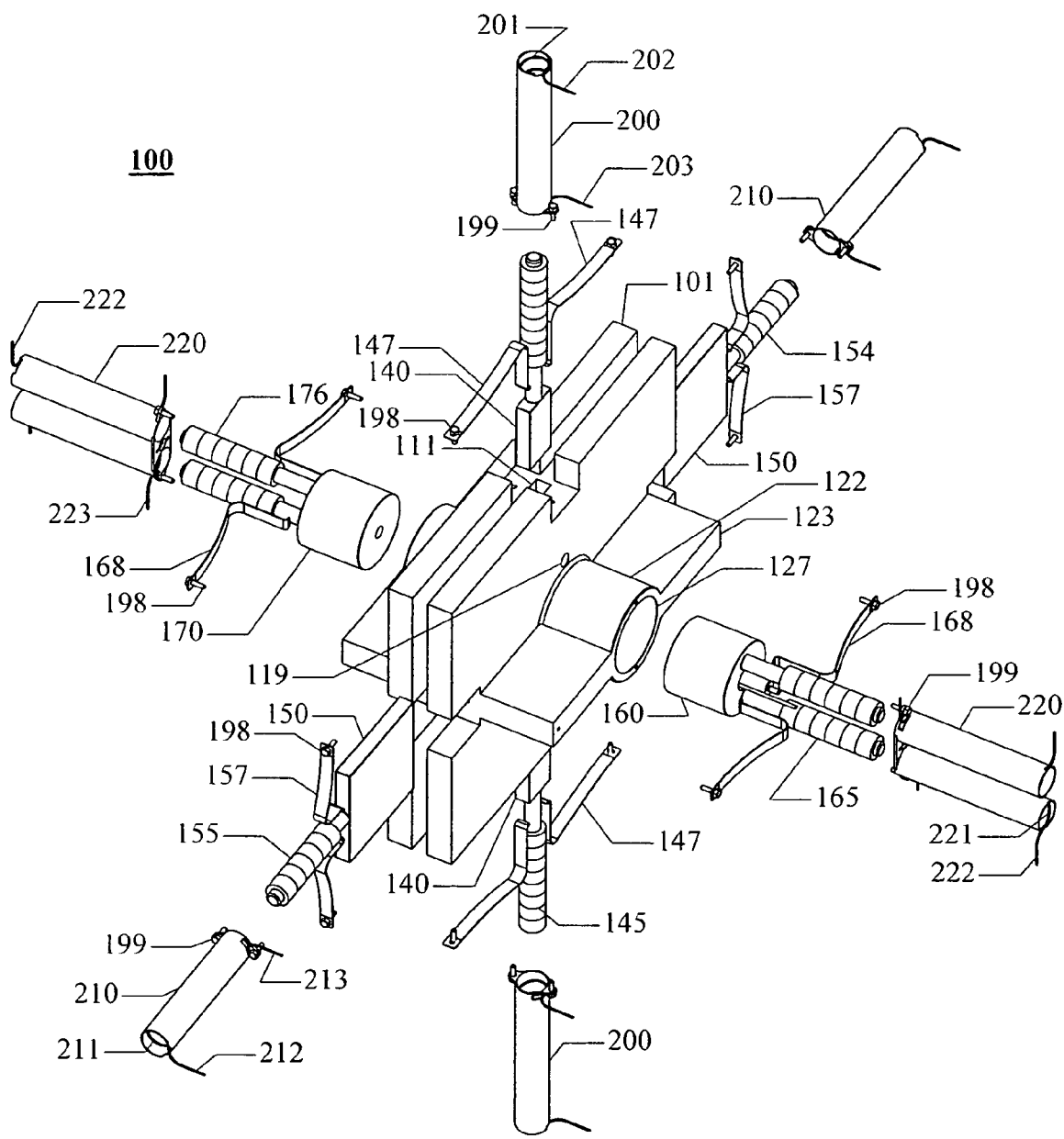
FIG. 4 is an oblique exploded view of the heat engine system of FIG. 3.

The heat engine 100 is seen in an oblique view in FIG. 3 and an exploded oblique view in FIG. 4. The heat engine will typically have steel, cast iron, stainless steel, or ferrous alloy body 101 housing three orthogonal sets of opposed reciprocable piston pairs.

The pistons are essentially free pistons, being constrained only by the pair of return springs and the electromotive forces induced in the linear generator associated with each piston. A chamber 130 is formed in the center of the body 101 of the engine and is intersected by passages for each of the three opposed pairs of pistons. The interior faces of the pistons are thus reactive to pressures within the chamber of the engine. The heat engine 100 is essentially symmetrical about each of its three orthogonal planes, with the piston sizes and masses, the return springs, and the linear generators for each piston in an opposed pair are essentially the same.

The working fluid for the chamber is steam, which is formed in an explosive manner by causing an injected single drop of water to be impinged by the highly concentrated solar beam 88 emerging from the concentrator lens 50 of the solar collector subsystem 11. When the pistons are caused to reciprocate outwardly by expansion of the working fluid in the chamber of the heat engine 100, the linear generators associated with and driven by each piston generate usable electrical power pulses. When the steam pressure is exhausted from the chamber, the pistons are caused to return to their starting positions in response to urging by their respective return springs.

Figure 17:
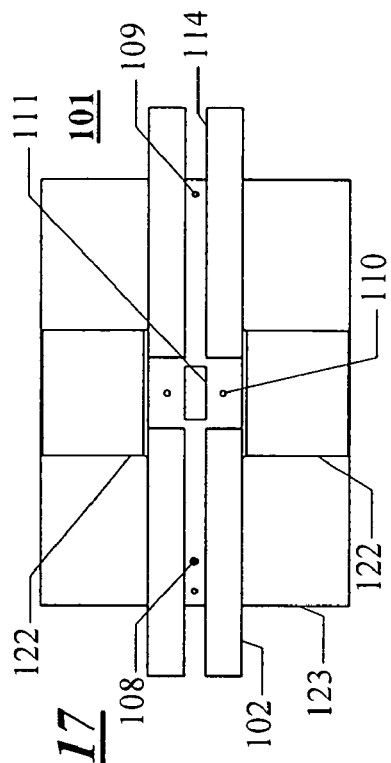
FIG. 17 is a view of the body of the heat engine in the direction of the axes of the passages for the small pistons.
Figure 16:
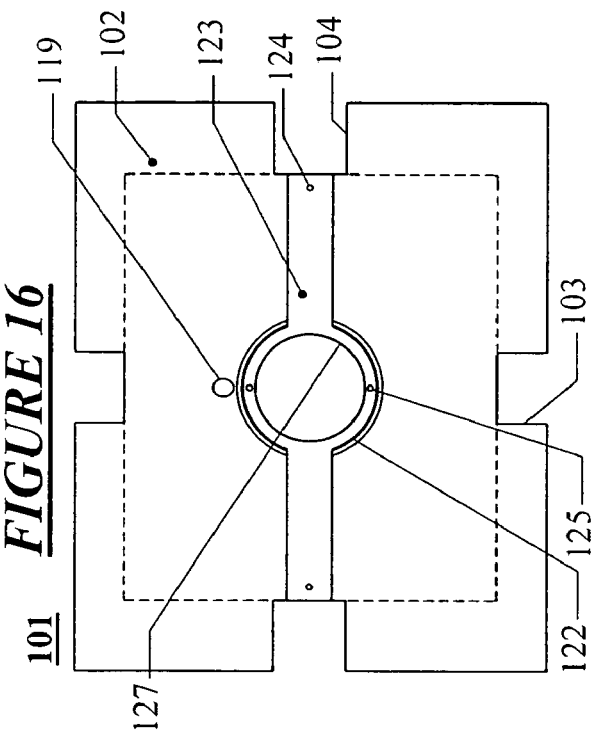
FIG. 16 is a view of the body of the heat engine in the direction of the axes of the cylinders for the windowed piston and the injector piston.
Figure 18:
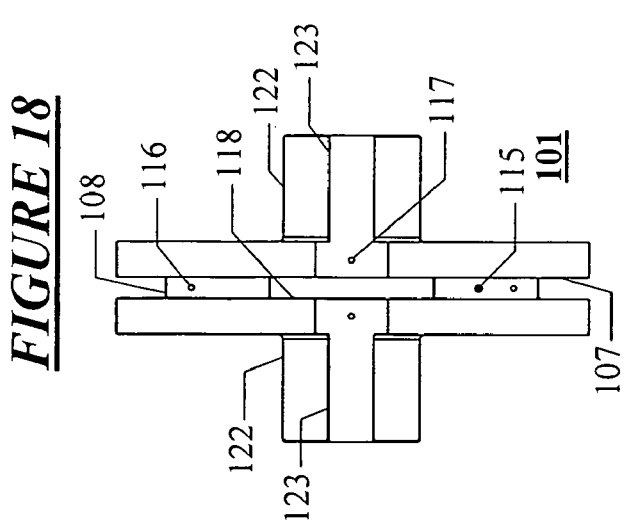
FIG. 18 is a view of the body of the heat engine in the direction of the axes of the passages for the medium pistons.

The geometry of the body 101 of the heat engine 100 is best explained by referring to FIGS. 16, 17, and 18, which are orthogonal views of said body. The body 101 is symmetrical about three orthogonal planes, and the intersections of those three orthogonal planes define the axes of the piston travel. The transverse body 102 is the central portion of the body 101 and houses the small pistons 140 and the medium pistons 150 in their respective passages 111 and 118.

As seen in FIG. 16, transverse body 102 is a right rectangular prism having mirror image rectangular first notches 103 cut out on the centerline of its upper and lower sides. Transverse body 102 also has mirror image rectangular second notches 104 cut out on the centerline of its right and left sides, as seen in FIG. 16. On the center of the upper and lower peripheral edges of the transverse body 102, rectangular cross-sectional horizontal grooves 107 are cut to the same depth as the first notches 103. The horizontal surfaces in the horizontal grooves are the horizontal groove bottoms 108.

A vertical drilled and tapped small piston return spring mount hole 109 is located near each outer end of each horizontal groove bottom 108. Equispaced on each side of the transverse midplane of transverse body 102, vertical drilled and tapped small piston coil mount holes 110 are positioned on each horizontal groove bottom 108. Rectangular small piston passage 111 penetrates completely through body 101 at the intersection of the two vertical axes of symmetry of the body.

On the center of the right hand and left hand peripheral edges of the transverse body 102, rectangular cross-sectional vertical grooves 114 are cut to the same depth as the second notches 104. The vertical surfaces in the vertical grooves 114 are the vertical groove bottoms 115. A horizontal drilled and tapped medium piston return spring mount hole 116 is located near each outer end of each vertical groove bottom 115. Equispaced on each side of the transverse midplane of transverse body 102, horizontal drilled and tapped medium piston coil mount holes 117 are positioned on each vertical groove bottom 115. Rectangular medium piston passage 118 penetrates completely through body 101 at the intersection of the transverse vertical axis and the horizontal axis of symmetry of the body.

Mirror image round exhaust vents 119 extend upwardly from their penetration from the central portion of the upper half of the small piston passage 111 to the exterior transverse faces of the transverse body 102. Exhaust vents 119 are located on the vertical midplane which is normal to the transverse midplane of transverse body 102.

Extending outwardly from each transverse face of the transverse body 102 are symmetrical cylindrical longitudinal bodies 122. Each longitudinal body 122 has an integral rectangular prismatic horizontal spring mount ear 123 projecting outwardly as far as the vertical groove bottom 115 on each side of its vertical midplane, with the spring mount ears 123 extending as far from the transverse body 102 as the longitudinal body. Near the transverse end of each of the ears 123 is located a horizontal axis drilled and tapped longitudinal piston return spring mount hole 124 parallel to the longitudinal axis of each longitudinal body 122. Symmetrically positioned about the horizontal midplane of the body 101 and on the vertical midplane and at the distal ends of the longitudinal bodies 122 near the outer edge of the cylindrical longitudinal bodies are horizontal drilled and tapped longitudinal piston coil mount holes 125. A circular longitudinal piston bore 127 extends completely through body 101 on the longitudinal axis of the longitudinal bodies 122.

The intersections in body 101 of the small piston passage 111, the medium piston passage 118, and the longitudinal piston bore 127, together with the faces which are the interior transverse ends of the opposed pairs of small pistons 140, medium pistons 150, and the opposed pair consisting of the windowed piston 160 and the injector piston 170 for a chamber 130. The chamber 130, centrally located in the body 101, is totally enclosed and provides a working volume for the engine 100.

Figure 5:
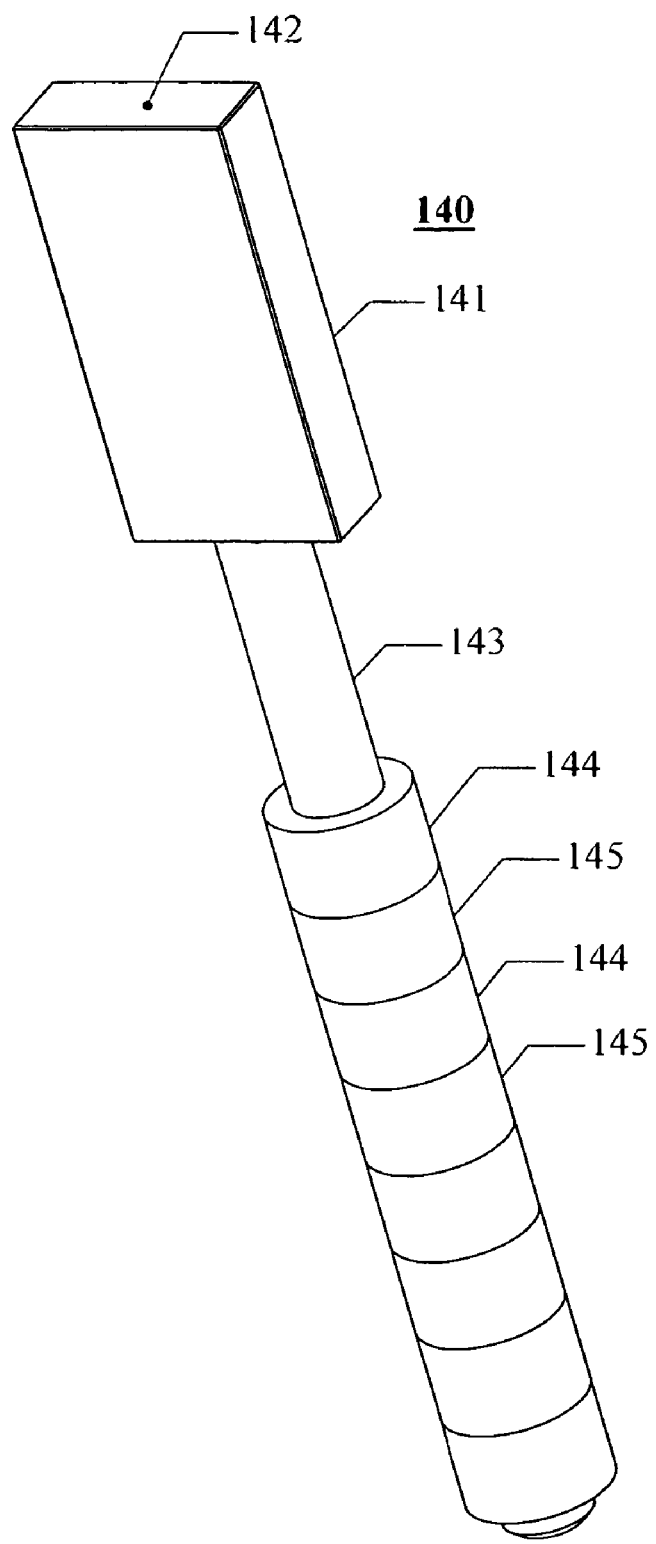
FIG. 5 is an oblique view of the small piston assembly of the heat engine system of FIG. 3.

Referring to FIG. 5, the small piston assembly 140 is seen in an oblique view. The small piston assembly 140 consists of the rectangular prismatic small piston head 141, with its small piston face 142 as the face exposed to the chamber, the integral elongate right circular cylindrical small piston shaft 143, and an array consisting of multiple magnet pairs each consisting of a small piston first ring magnet 144 and a small piston second ring magnet 145. The small piston face 142 has one rectangular side substantially larger than the other. The small piston head 141 is a close slip fit within the small piston passage 111 of the body 101.

No seals are utilized on the body of the small piston, but the minimization of the gap between piston assembly 140 and small piston passage 111 holds blowby to an acceptable amount. The small piston shaft 143 extends from the side of the small piston head 141 opposite to small piston face 142 and has its longitudinal axis colinear with the axis of symmetry of the piston head extending in that direction. The magnets 144 and 145 are oppositely polarized so that each pair forms a toroidal field about the axis of the shaft 143. The magnets 144 and 145 have their bores snuggly fitting to and rigidly mounted to the shaft 143 of the small piston, using an adhesive such as epoxy, at a distance from the small piston head 141.

Figure 11:
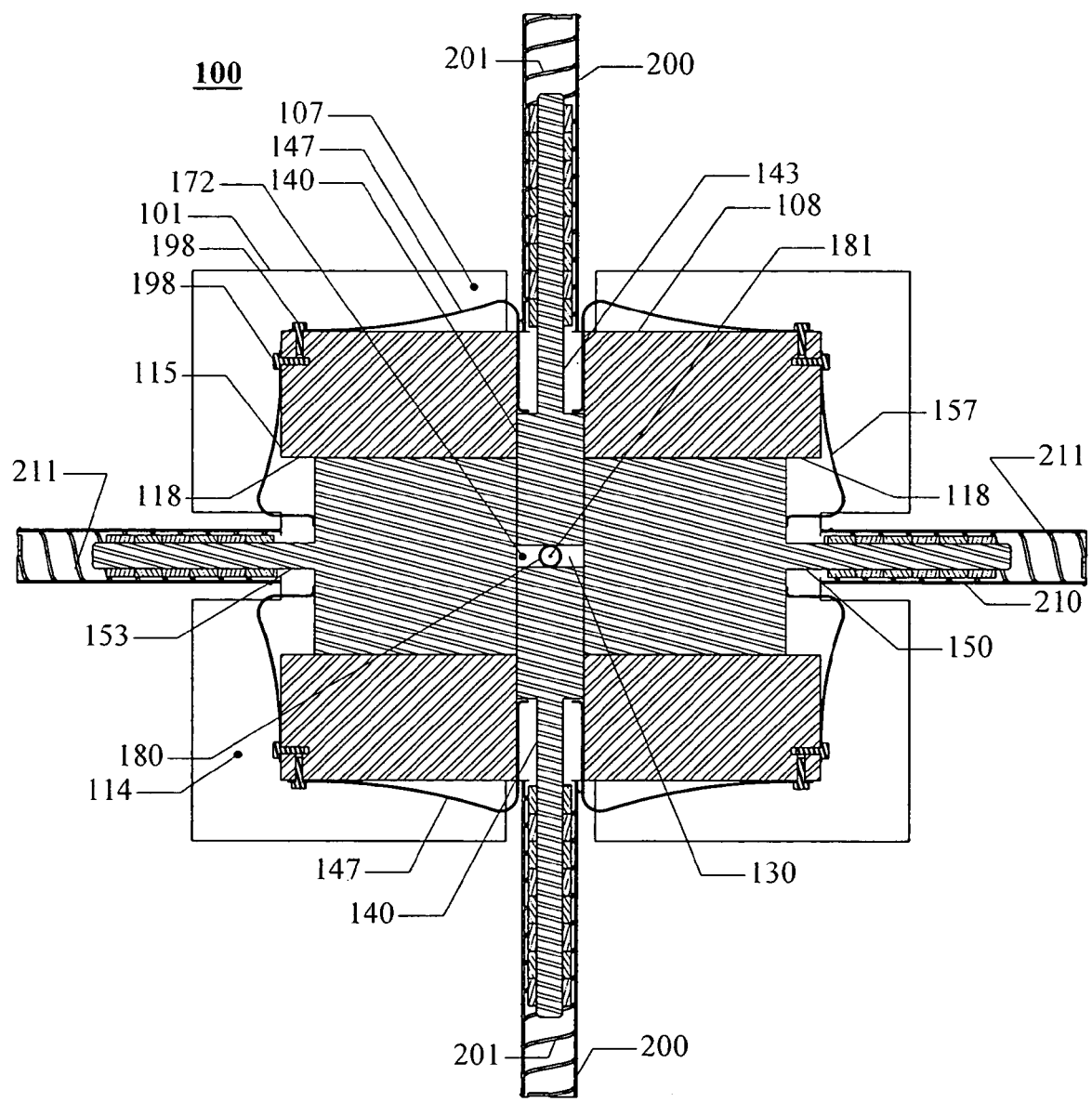
FIG. 11 is a transverse cross-sectional view taken through the center of the heat engine system of FIG. 3 and the small and medium pistons when the engine is ready for a power stroke.

Not shown in FIG. 5, but seen in the exploded engine assembly view of FIG. 4 and in a side view in FIG. 11, each small piston assembly 140 also includes two leaf springs which serve as small piston return springs 147. These springs 147 are made of flat stock strips which have at a first end a short flat section with a transverse through mounting hole. The unstressed spring 147 bends in an arc away from the plane at its first end and then is recurved in the opposite direction sufficiently so that it extends normal to and past the plane at its first end. The tip of the spring 147 is then tightly recurved at its second end to form a contact tip.

The small piston return springs 147 are mounted on the horizontal groove bottoms 108 using return spring mounting screws 198 which are installed through the mounting holes in the first ends of the springs and then threadedly engaged in the small piston return spring mount holes 109. When installed, the small piston return springs lie within the horizontal grooves 107 of body 101 with their second ends extending inwardly toward the center of the body slightly past the edge of the small piston passage 111. The second ends of the piston return springs 147 bear on the end of the small piston head 141 that is opposed to the piston face 142.

Figure 6:
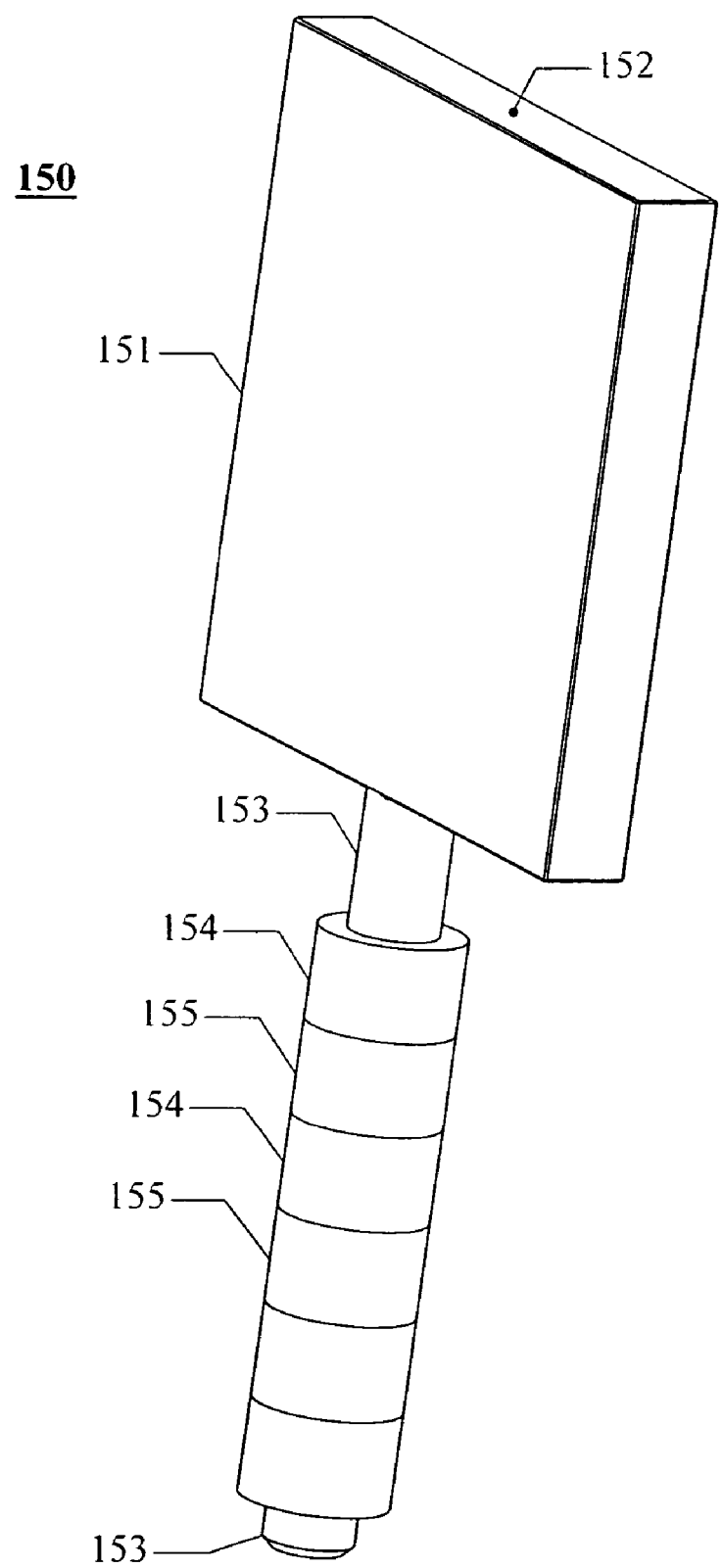
FIG. 6 is an oblique view of the medium piston assembly of the heat engine system of FIG. 3.

Referring to FIG. 6, the medium piston assembly 150 is seen in an oblique view. The medium piston assembly 150 consists of the rectangular prismatic medium piston head 151, with its medium piston face 152 as the face exposed to the chamber, the integral elongate right circular cylindrical medium piston shaft 153, and an array consisting of multiple magnet pairs each consisting of a medium piston first ring magnet 154 and a medium piston second ring magnet 155. The medium piston face 152 has one rectangular side substantially larger than the other. The medium piston head 151 is a close slip fit within the medium piston passage 118 of the body 101. No seals are utilized on the body of the medium piston, but the minimization of the gap between piston assembly 150 and medium piston passage 118 holds blowby to an acceptable amount. The medium piston shaft 153 extends from the side of the medium piston head 151 opposite to medium piston face 152 and has its longitudinal axis colinear with the axis of symmetry of the piston head extending in that direction. The magnets 154 and 155 are oppositely polarized so that each pair forms a toroidal field about the axis of the shaft 153. The magnets 154 and 155 have their bores snuggly fitting to and rigidly mounted to the shaft 153 of the medium piston, using an adhesive such as epoxy, at a distance from the medium piston head 151.

Not shown in FIG. 6, but seen in the exploded engine assembly view of FIG. 4 and in a side view in FIG. 11, each medium piston assembly 150 also includes two leaf springs which serve as medium piston return springs 157. These springs 157 are made of flat stock strips which have at a first end a short flat section with a transverse through mounting hole. The unstressed spring 157 bends in an arc away from the plane at its first end and then is recurved in the opposite direction sufficiently so that it extends normal to and past the plane at its first end. The tip of the spring 157 is then tightly recurved at its second end to form a contact tip.

The medium piston return springs 157 are mounted on the vertical groove bottoms 115 using return spring mounting screws 198 which are installed through the mounting holes in the first ends of the springs and then threadedly engaged in the medium piston return spring mount holes 116. When installed, the medium piston return springs lie within the vertical grooves 114 of body 101 with their second ends extending inwardly toward the center of the body slightly past the edge of the medium piston passage 118. The second ends of the piston return springs 157 bear on the end of the medium piston head 151 that is opposed to the piston face 152.

Figure 7:
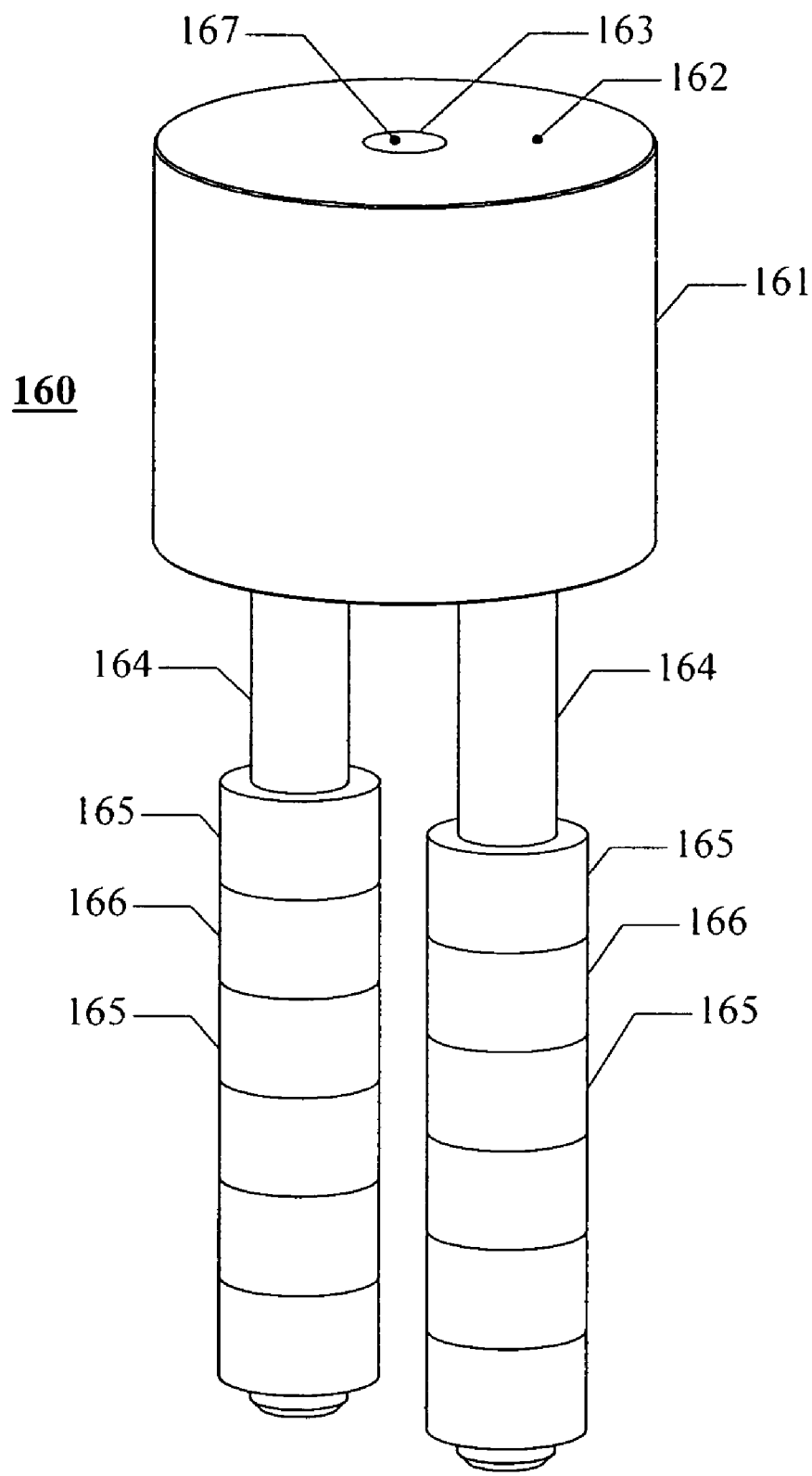
FIG. 7 is an oblique view of the windowed piston assembly of the heat engine system of FIG. 3.
Figure 8:
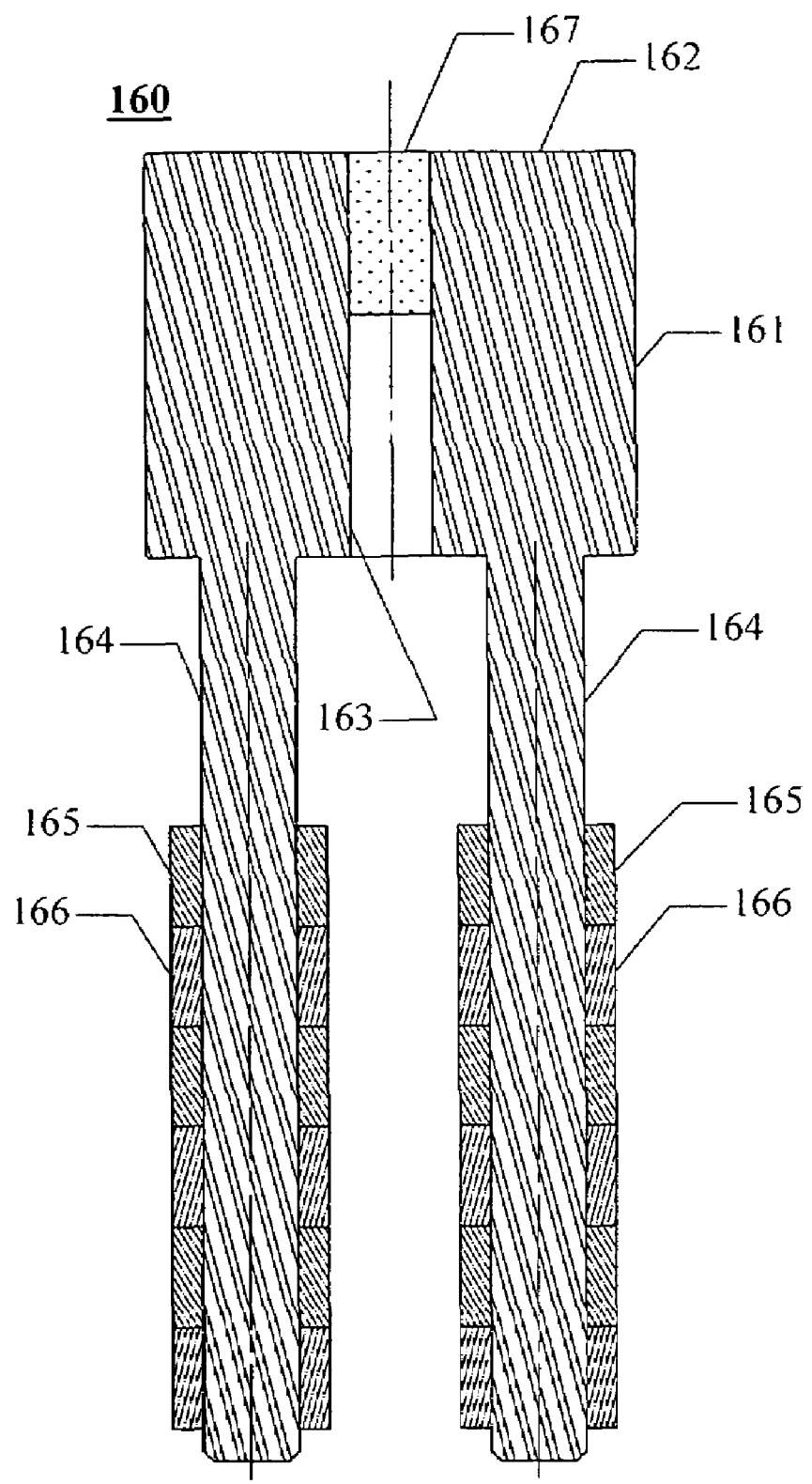
FIG. 8 is a longitudinal cross-sectional view taken through the two magnet support rods of the windowed piston assembly of FIG. 7.

Referring to FIGS. 7 and 8, the windowed piston assembly 160 is respectively seen in an oblique and a longitudinal cross-sectional view. The windowed piston assembly 160 consists of the right circular cylindrical windowed piston head 161, with its windowed piston face 162 as the face exposed to the chamber, a pair of symmetrically opposed integral elongate right circular cylindrical windowed piston shafts 164, and an array consisting of multiple magnet pairs each consisting of a windowed piston first ring magnet 165 and a windowed piston second ring magnet 166. Constant diameter windowed piston axial bore 163 extends through the entire body 161 of the windowed piston 160 along the cylindrical axis of the body. The windowed piston head 161 is a close slip fit within the longitudinal piston bore 127 of the body 101. No seals are utilized on the body of the windowed piston, but the minimization of the gap between piston assembly 160 and longitudinal piston bore 127 holds blowby to an acceptable amount. The windowed piston shafts 164 extend from the side of the windowed piston head 161 opposite to windowed piston face 162 parallel to the cylindrical axis. The magnets 165 and 166 are oppositely polarized so that each pair forms a toroidal field about the axis of its mounting shaft 164. The magnets 165 and 166 have their bores snuggly fitting to and rigidly mounted to the shafts 164 of the windowed piston, using an adhesive such as epoxy, at a distance from the windowed piston head 161. Mounted snuggly in the windowed piston axial bore 163 with a transverse face flush with windowed piston face 162 is right circular cylindrical quartz window 167. Window 167 is either press-fitted in bore 163 or is mounted adhesively so that the connection is leak-free.

Figure 12:
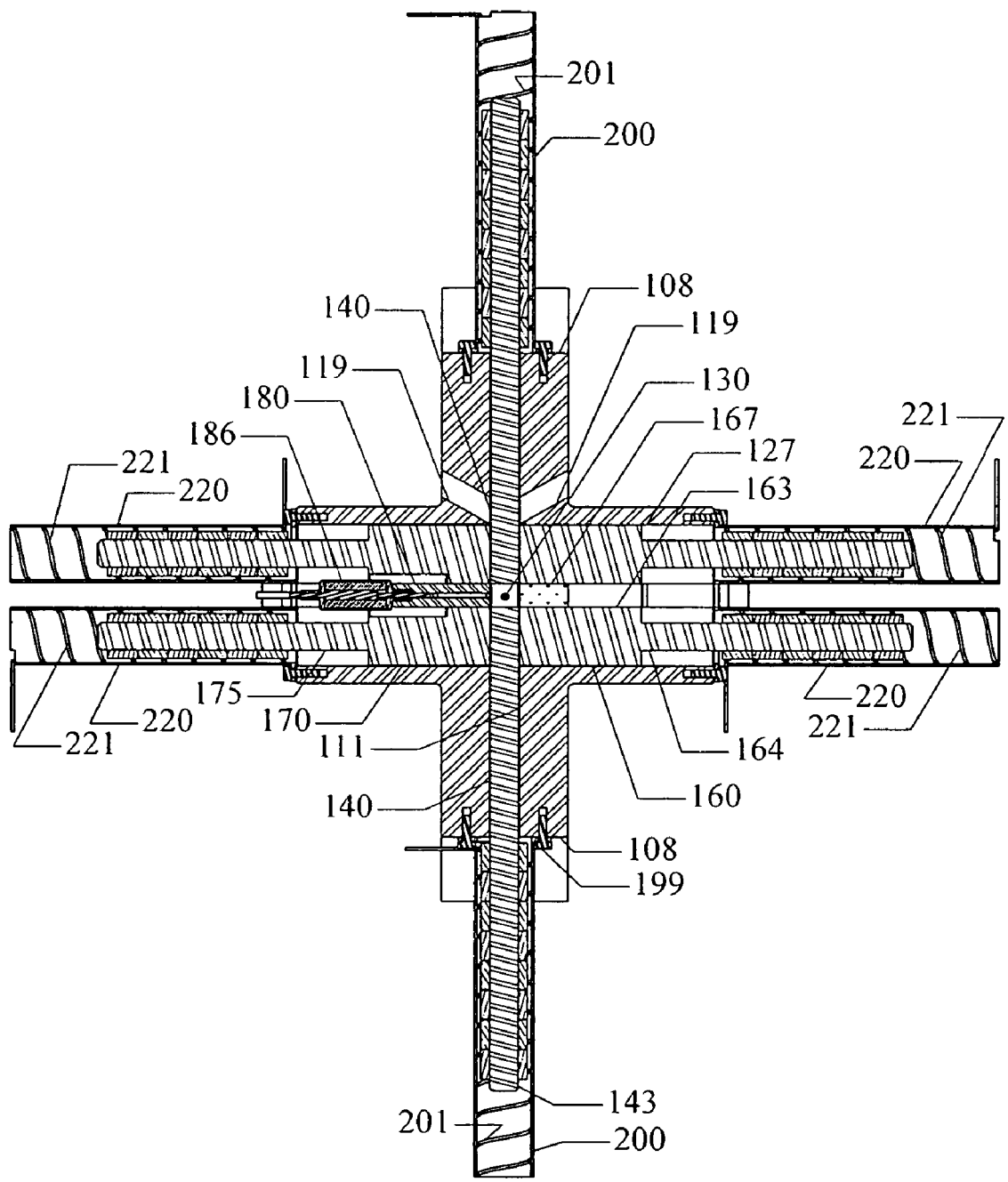
FIG. 12 is a transverse cross-sectional view taken through the center of the heat engine system of FIG. 3 and the small pistons, the windowed piston, and the injector piston when the engine is ready for a power stroke.

Not shown in FIGS. 7 and 8 but seen in the exploded engine assembly view of FIG. 4 and in a side view in FIG. 12, the windowed piston assembly 160 also includes two leaf springs which serve as windowed piston return springs 168. These springs 168 are made of flat stock strips which have at a first end a short flat section with a transverse through mounting hole. The unstressed spring 168 bends in an arc away from the plane at its first end and then is recurved in the opposite direction sufficiently so that it extends normal to and past the plane at its first end. The tip of the spring 168 is then tightly recurved at its second end to form a contact tip.

As seen in FIG. 4, the windowed piston return springs 168 are mounted on the outer ends of the righthand spring mount ears 123 of the longitudinal body 122 of the body 101 using return spring mounting screws 198 which are installed through the mounting holes in the first ends of the springs and then threadedly engaged in the longitudinal piston return spring mount holes 124. When installed, the windowed piston return springs 168 have their second ends extending inwardly toward the center of the body slightly past the edge of the longitudinal piston bore 127. The second ends of the windowed return springs 168 bear on the end of the windowed piston head 161 which is opposed to the piston face 162.

Figure 9:
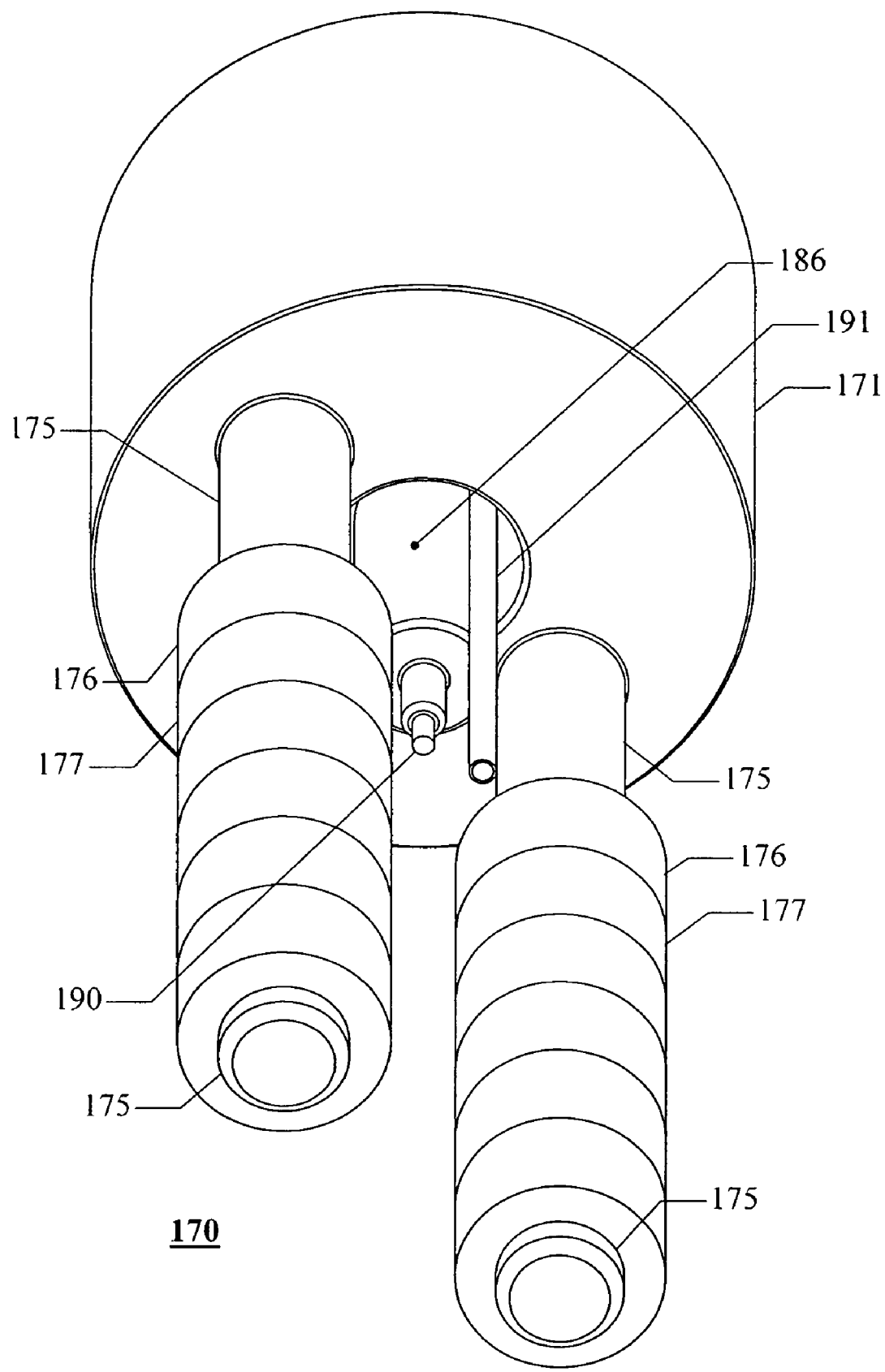
FIG. 9 is an oblique view of the injector piston assembly of the heat engine system of FIG. 3.
Figure 10:
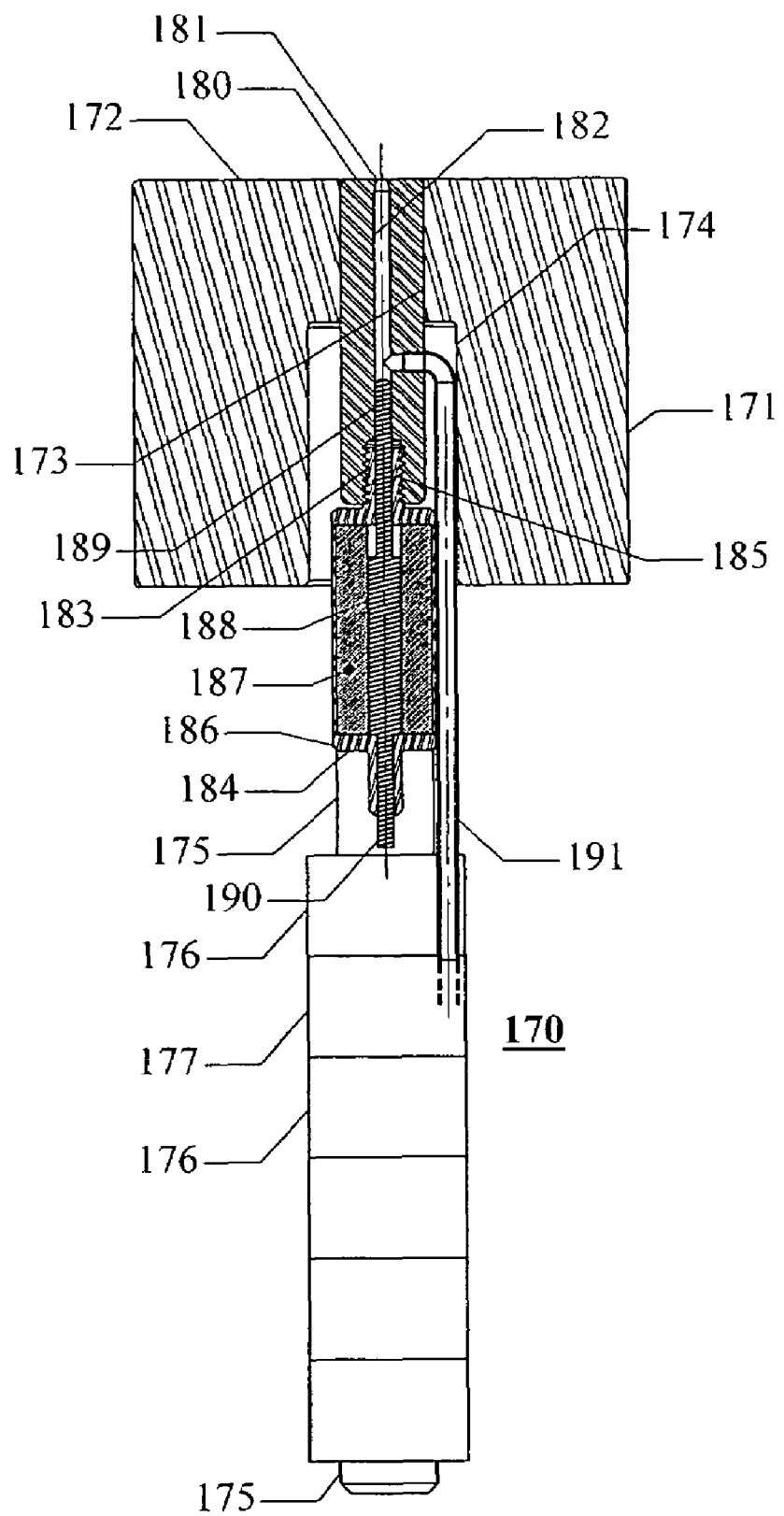
FIG. 10 is a longitudinal cross-sectional view taken normal to the plane passing through the centerlines of the two magnet support rods of the injector piston assembly of FIG. 9.

Referring to FIGS. 9 and 10, the injector piston assembly 170 is respectively seen in an oblique and a longitudinal cross-sectional view. The injector piston assembly 170 consists of the right circular cylindrical injector piston head 171, with its injector piston face 172 as the face exposed to the chamber, a pair of symmetrically opposed integral elongate right circular cylindrical injector piston shafts 175, and an array consisting of multiple magnet pairs each consisting of an injector piston first ring magnet 176 and an injector piston second ring magnet 177. Injector piston axial bore 173 extends along the cylindrical axis of the body from piston face 172 partially through the cylindrical body 171, where it is joined by coaxial injector piston counterbore 174, which extends to the side of the body 171 opposed to the face 172. The injector piston head 171 is a close slip fit within the longitudinal piston bore 127 of the body 101. No seals are utilized on the body of the injector piston, but the minimization of the gap between piston assembly 170 and longitudinal piston bore 127 holds blowby to an acceptable amount. The injector piston shafts 175 extend from the side of the injector piston head 171 opposite to piston face 172 parallel to the cylindrical axis. The magnets 176 and 177 are oppositely polarized so that each pair forms a toroidal field about the axis of its mounting shaft 175. The magnets 176 and 177 have their bores closely fitting to and rigidly mounted to the shafts 175 of the injector piston, using an adhesive such as epoxy, at a distance from the injector piston head 171.

Not shown in FIGS. 9 and 10 but seen in the exploded engine assembly view of FIG. 4, the injector piston assembly 170 also includes two windowed piston leaf springs 168 which serve as return springs for the injector piston. The mounting of this second set of windowed piston return springs 168 is done similarly to what is used for the windowed piston assembly 160, but with the exception that the positioning of the springs 168 and their mounting screws 198 is rotated 180° about the vertical axis of symmetry of body 101 so that they are mounted on the lefthand spring mount ears 123 of the longitudinal body 122.

Referring to FIG. 10, the details of the injector 180 for the injector piston assembly 170 can be seen. The piston diameters and the masses of the windowed piston assembly 160 and the injector piston assembly 170 are adjusted to be substantially identical. Injector 180 is an elongated right circular cylindrical member having a constant outer diameter which is a press fit into the axial bore 173 of the injector piston body 171. The injector 180 has its first end flush with the injector piston face 172.

From its second end, injector 180 has a counterbore 183 with helically cut threads, an elongated bore which extends most of the length of the part and serves as the injector chamber 182, and a reduced diameter exit which serves as the injector nozzle 181. Approximately at midlength, the injector has a radial hole extending from the injector chamber 182 to the exterior of the injector body. A short counterbore on the outer end of the radial hole serves as a socket for the sealing engagement of J-shaped water or other liquid supply tube 191. Water or other liquid supply tube 191 is joined to injector 180 by brazing, welding, or adhesive means.

The injector solenoid assembly 184 consists of injector solenoid 186 and solenoid armature 188. Injector solenoid 186 has a right circular cylindrical tubular coil 187 wound in a manner typical to commercially available solenoids and having externally extending electrical leads (not shown). The body of injector solenoid 186 is a right circular cylindrical metallic shell having transverse ends which closely fit to the exterior of the coil 187. On its upper end as seen in FIG. 10, the solenoid body has a tubular extension threaded nose 185 with external threads which are threadedly and sealingly engaged with the female threads in the second end of the injector 180. On its lower end, solenoid body 186 has a second tubular extension.

A ferromagnetic solenoid armature 188 is positioned within the interior of the solenoid body 186 and projects outwardly therefrom at both ends. Solenoid armature 188 has a central elongated right circular cylindrical portion which is responsive to magnetic fields induced in the solenoid coil 187 whenever the coil is energized by voltage application. The length of the central portion of the armature 188 is shorter than length of the solenoid coil 187. With the solenoid coil unenergized, as shown in FIG. 10, an elongated concentric right circular cylindrical reduced diameter injector plunger 189 extends from the central portion of the solenoid armature on its upper end into the injector chamber 182 of the injector 180 almost to the entry of the radial hole in the injector. The injector plunger sealingly engages the injector chamber 182. Another elongated right circular cylinder, the armature tail piece 190, extends downwardly concentrically from the armature 188 and through the second tubular extension of the solenoid body 186. The solenoid assembly can be provided with a return spring (not shown) or alternatively it can be provided with a second, return coil (not shown), as is well understood by those skilled in the art.

Each of the small piston assemblies 140 and medium piston assemblies 150 is provided with a tubular generator coil which closely surrounds the magnets mounted on its shaft and which can be excited by reciprocating the piston through its coils. Small piston generator coil 200 consists of an elongated thin-walled right circular tube which has radially opposed outwardly extending transverse mounting tabs at a first end. Each mounting tab has a through hole through which a coil mounting screw 199 can be extended so that the coil 200 can be mounted to the horizontal groove bottom 108 of the body 101 by threadedly engaging the screws 199 in the small piston coil mount holes 110.

A generator winding 201 is attached by adhesives to the interior bore of the small piston generator coil 200. The second and first ends of the generator coil 200 are notched to provide clearance for passage of, respectively, the first lead 202 and the second lead 203 of the winding 201. For the sake of simplicity, the structure of the winding 201 is shown as a helical coil, but other more efficient types of winding patterns may be utilized in order to obtain a higher power output from reciprocation of the magnets of small piston assembly 140.

For the medium piston assembly 150, a medium piston generator coil 210 having construction identical to or very similar to that of coil 200 is provided. For the medium piston generator coil 210, the following feature numbers are used. Its winding is item 211, its first lead is 212, and its second lead is 213. The mounting to the vertical groove bottoms 115 is also similarly done by using two screws 199 to threadedly engage the coil mounting holes 117.

The windowed piston assembly 160 and the injector piston assembly 170 use identical, or nearly identical, longitudinal piston generator coils 220. The longitudinal piston generator coil 220 is structurally similar to the generator coils 200 and 210, but with provision of two tubes on a single mounting base. For the longitudinal piston generator coil 220, each of the tubes is diametrically opposed at a similar distance from the center of the coil 220. Each tube contains a longitudinal piston generator winding 221 having first 222 and second 223 leads. The mounting of the coils 220 is by means of a pair of screws 199 engaged through diametrically offset mounting tab holes and threadedly engaged with the longitudinal piston coil mount holes 125 on the longitudinal bodies 122 of the heat engine body 101.

Figure 22:
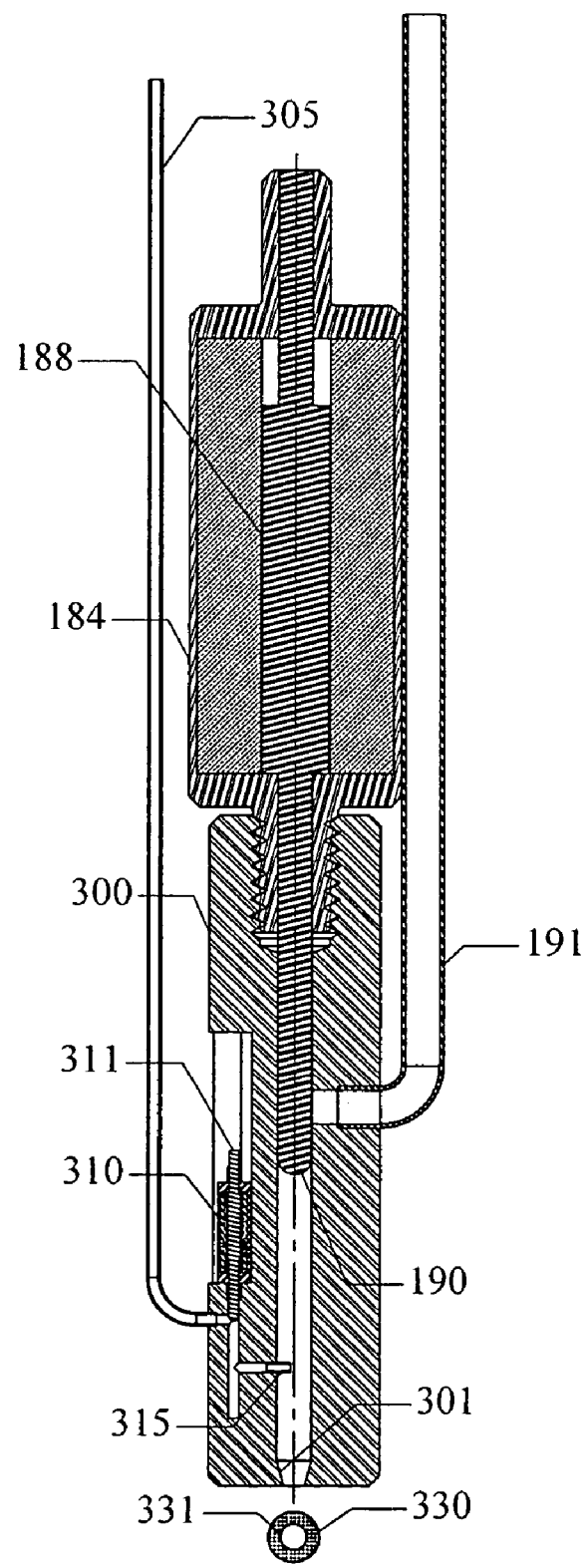
FIG. 22 corresponds to FIGS. 20 and 21, but shows the ejected water droplet with its internal air bubble as it exits from the injector nozzle.

A second type of water droplet injector is shown in FIGS. 20, 21, and 22. First alternative injector 300 is able to produce water droplets 330 which have an internal air bubble 331. The construction of injector 300 utilizes several of the same elements as injector 180, and it is mounted in the injector piston 170 in the same manner. Injector 300 is an elongated right circular cylindrical member having a constant outer diameter which is a press fit into the axial bore 173 of the injector piston body 171. The injector 300 has its first end flush with the injector piston face 172. From its second end, injector 300 has a tapped counterbore 303 with helically cut threads, an elongated bore which extends most of the length of the part and serves as the injector chamber 302, and a reduced diameter exit which serves as the injector nozzle 301. Approximately at midlength injector 300 has a radial hole extending from the injector chamber 302 to the exterior of the injector body. A short counterbore on the outer end of the radial hole serves as a socket for the sealing engagement of J-shaped water supply tube 191. Water supply tube 191 is joined to injector 300 by brazing, welding, or adhesive means.

An injector solenoid 184 is threadedly engaged by its male threaded nose 185 with the tapped counterbore 303 of the body of injector 300. For the nonactivated state of the solenoid 184, the injector plunger 189 of the injector solenoid assembly extends with a close fit into the injector chamber as far as the radial hole for the water supply tube 191, as seen in FIG. 20.

On one side at approximately midlength of injector 300, a side pocket 304 with transverse ends is cut into the exterior cylindrical surface of the injector body. At the end of the side pocket 304 adjacent the first end of the injector body, an air passage 312 is drilled parallel to but offset from the injector chamber 302. The air passage intersects the side pocket 304 in the central portion of its lower face as shown in FIG. 20. The side pocket end of air passage 312 is counterbored to sealingly receive a mounting nose of air injector solenoid 310, which is attached thereto by brazing or adhesives.

Air passage 312 is intercepted by a first radial air hole 313 into which J-shaped upwardly extending air supply tube 305 is sealingly mounted at the outer end of the hole by brazing, welding, or adhesives. The first radial air hole 313 does not extend inwardly beyond its intersection with air passage 312. A second radial air hole 314 is positioned closer to the first end of the body of injector 300 and extends from air passage 312 into the interior of injector chamber 302. Projecting air insertion tube 315 is press-fitted into the inner end of second radial air hole 314 so that the tube extends almost to the center of the injector chamber 302.

The air injector solenoid 310 is constructed similarly to the injector solenoid 184, but it is proportioned on a smaller scale. The air injector plunger 311 is a miniaturized version of the solenoid armature 188 of the injector solenoid 184. The lower end of the plunger 311 of air injection solenoid 310 is a close fit to air passage 312 and extends into that air passage to the intersection of first radial hole 313 when the solenoid 310 is not actuated, as shown in FIG. 20. When solenoid 310 is actuated as shown in FIGS. 21 and 22, then the plunger 311 extends further into the air passage 312, thereby urging any air in the passage outwardly through second radial air hole 314 and tube 315 and hence into the injector chamber 302.

A third type of water droplet injector is shown in FIGS. 23 and 24. Second alternative injector 400 is able to produce water droplets 415 which have a frozen exterior shell 417 and a liquid interior 416. The construction of injector 400 utilizes several of the same elements as injector 180, and it is mounted in the injector piston 170 in the same manner.

Injector 400 is an elongated right circular cylindrical member having a constant outer diameter which is a press fit into the axial bore 173 of the injector piston body 171. The injector 400 has its first end flush with the injector piston face 172. From its second end, injector 400 has a tapped counterbore 403 with helically cut threads, an elongated bore which extends most of the length of the part and serves as the injector chamber 402, and a reduced diameter exit which serves as the injector nozzle 401, and an outwardly opening frustroconical exit bore 406.

Approximately at midlength injector 400 has a radial hole extending from the injector chamber 402 to the exterior of the injector body. A short counterbore on the outer end of the radial hole serves as a socket for the sealing engagement of J-shaped water supply tube 191. Water supply tube 191 is joined to injector 400 by brazing, welding, or adhesive means. An injector solenoid 184 is threadedly engaged by its male threaded nose 185 with the tapped counterbore 403 of the body of injector 400. For the nonactivated state of the solenoid 184, the injector plunger 189 of the injector solenoid assembly extends with a close fit into the injector chamber 402 as far as the radial hole for the water supply tube 191.

At approximately midlength, two diametrically opposed radial holes 413 and 414 extend inwardly from the exterior cylindrical surface of the body of injector 400 to approximately halfway to the bore of chamber 402. Hole 414 is the coolant entry hole and hole 413 is the coolant exit hole. The exterior ends of holes 413 and 414 are counterbored to permit the mounting of, respectively, coolant supply tube 407 and coolant return tube 408. Upwardly extending J-shaped tubes 407 and 408 are sealingly engaged in the counterbored outer ends of holes 413 and 414 by brazing, welding, or adhesives. Offset from and parallel to chamber 402 are coolant inlet channel 404 and coolant outlet channel 405. Coolant inlet channel 404 intersects coolant entry hole 414 on its upper end and a first, smaller diameter annular groove in the frustroconical face of the recess 406. Coolant exit channel 405 intersects coolant exit hole 413 at its upper end and a second, larger diameter annular groove in the frustroconical face of the recess 406.

Cooling cone 409 is sealingly mounted to the frustroconical recess 406 at its outer upper and lower ends. Cooling cone 409 is made of a material having a high thermal conductivity and has a blackened interior frustroconical face. Near its upper, smaller diameter end, cooling cone 409 has a first annular external groove which serves as a distribution header 410. Near its lower, larger end, cooling cone 409 has a second annular external groove which serves as a return header 411. In between the distribution header 410 and the return header 411 is a very shallow frustroconical external groove 412 which serves as a throttling passage and heat transfer surface between the exterior of cooling cone 409 and coolant which is caused to flow through the system. The flow path for the coolant which is used to chill the cooling cone 409 is in by coolant supply tube 407, through radial hole 414 and channel 404, into distribution header 410, through groove 412, into return header 411, up passage 405, into radial hole 413, and out tube 408.

FIGS. 23 and 24 show the injector 400 when it has just injected a water droplet 415 into the chamber 130 of the heat engine 100. During its passage from the nozzle 401 and through the cooling cone 409, the water droplet 415 has formed a frozen shell 417 encapsulating liquid water 416 in response to radiative heat losses to the chilled cooling cone.

Operation of the Invention

The operation of the invention is as follows. The operation involves the following operations: 1. concentration and directing of the incident solar radiation impinging on a panel of heliostats, 2. directing the resultant beam of concentrated solar radiation into the chamber of a heat engine, 3. injecting a droplet of working fluid into the chamber of the engine where it can be vaporized at a very high rate by impingement of the solar radiation, and 4. causing the pistons of the engine to reciprocate responsive to the action of the working fluid vapor, whereby electric energy can be generated by coupling linear electric generators to each of the pistons of the heat engine.

Referring to FIG. 1, the solar collector subsystem 11 can be seen. Except for the motions made by the adjustable heliostat mirror systems 20a,b,c and the rotation of the shutter 69 and the associated components of the shutter assembly 68, the solar collector subsystem is static. As the sun moves across the sky, the mirror plate 21 of a given heliostat 20 has to be aligned by rotation both about its vertical axis at the center of the pedestal and about its horizontal axis through the horizontal shaft of the tee bar 34.

The continual adjustment of alignment is required in order to keep the reflected solar radiation 86 directed at the parabolic mirror 40. The self-actuated roller bearings 24, which serve to support the movable mirror plate 21 about both its horizontal and vertical axes, are induced to cause incremental motion in finite steps by the application of voltage to the piezoelectric pawl elements which actuate the bearings in a predetermined, selectable manner. Because the motions of the piezoelectric pawl elements are relatively small, positioning errors are maintained well within acceptable margins for solar collector devices. Extreme precision is not necessary, since the sun is not a point source of incoming radiation. Programmable controller devices (not shown) are used to properly time and sequence the application of voltages to the pawl elements of the bearings 24. These programmable control devices are provided with memories in which a program can be stored so that the controller can deliver the voltages necessary with the required timing and frequency in order to actuate a proper predetermined sequence of rotations of the bearings 24.

The incident sunbeams 85 are thus reflected off the properly aligned heliostats 20 so that the reflected sunbeams are directed at the parabolic mirror 40 and then reflected again into a more concentrated ray 87. The concentrated ray 87 is directed at the convex concentrator lens 50, where it is focused into a much narrower emergent beam 88.

The degree of solar radiation concentration possible for the sequence of reflection and lens refraction steps for this process is multiplicative, so very high final intensities for the beam 88 are possible. If, for example, 20 heliostat mirror systems 20 were used for the first concentration step, then the effective concentration would be 20. An achievable ratio of concentration for the parabolic mirror 40 would be 10. If the convex concentrator lens then further concentrates beam 87 by a factor of 20, then the overall concentration of the incoming radiation beam is about 4000 times [i.e., (20)×(10) ×(20) =4000].

The concentrated solar beam 88 is directed into the light entry port 61 of the engine mounting box 60 so that it can be utilized to operate the heat engine 100 mounted therein. The rotation of the shutter 69 of the shutter assembly 68 is closely controlled so that the window 72 of the shutter admits passage of the concentrated solar beam 88 when a drop of water is to be vaporized by the heat engine. At other times, the reflective face 70 of the shutter 69 reflects the solar beam 88 away from the engine 100, thereby avoiding damage to the components of the engine from excess heating. Pressurized coolant is injected into the interior of the shutter 69 via the inlet swivel 74 so that it can absorb energy when it expands from the heated interior surface behind the reflective face 70. The resultant vaporized coolant is educted from the interior of the shutter 69 by way of the outlet swivel 76.

The heat engine 100 is aligned within the engine mounting box 60 so that the cylindrical axis of the windowed piston 160 and, hence, its integral window 167 are aligned to pass the incident concentrated solar beam 88 into the chamber 130 in the interior of the engine. At the start of a cycle of operation, the opposed small pistons 140, the medium pistons 150, and opposed windowed piston 160 and injector piston 170 are in the positions shown in FIGS. 11 and 12. At such a time, these pistons are at their closest position to the center of the engine, having been returned there in response to the urging of their respective return springs 147, 157, and 168.

To initiate a cycle of the engine 100, a single droplet of water (not shown) is injected into chamber 130 through the injector nozzle 181 of the injector 180 of the injector piston 170. The droplet is injected in the axial direction for piston 170, so it moves directly in the path of the incident concentrated solar beam 88 passing into the engine 100 through the window 167 of windowed piston 160. Referring to FIG. 10, the droplet injection is initiated by energizing the solenoid coil 187 so that the solenoid armature 188 with its integral plunger 189 is rapidly moved into the injector chamber 182, blocking the radial entry hole for the water supply tube 191. Further movement of the plunger 189 causes a droplet of water to be ejected from the nozzle 181 of the injector 180. The speed of injection of the droplet is chosen to be such that the droplet will be substantially in the center of the chamber 130 of the engine 100 when it is vaporized.

The amount of energy in such an intensely concentrated beam 88 is sufficient to vaporize a droplet of water at explosive rates, so that pressures of several hundred atmospheres are produced by the resultant vapor. The ability of the target droplet of water to absorb incident solar radiation is optionally enhanced by adding light absorptive colorant, as is well known in the solar industry.

These intense vapor pressures generated in chamber 130 act upon the piston faces 142, 152, 162, and 172 of pistons 140, 150, 160, and 170, respectively, causing the pistons to move outwardly in their respective passages 111, 118, and 127 of the body 101 of the engine 100. Because the opposed pistons in each pair have substantially the same active areas on their faces and the same masses, as well as the same applied pressures due to the vaporization of the droplet in the center of chamber 130, the opposed pistons will move outwardly at the same rate. This symmetry of motion causes the engine 100 to be inherently dynamically stabilized, so that vibration is minimized.

The combination of the magnets on the shafts of the pistons with their associated coils constitutes a set of multiple linear electric generators. When the pistons 140, 150, 160, and 170 move outwardly from their starting positions in FIGS. 11 and 12 to their extreme outward positions shown in FIGS. 13 and 14, the magnet fields associated with their arrays of magnets in the piston assemblies are moved past the windings 201, 211, and 221 of their respective coils 200, 210, and 220. Accordingly, voltages and currents are induced in the windings and are transferable by conventional electrical winding to an electric power collection system (not shown). Because the rate of outward movement of the pistons is so high during the expansion of the vapor from the vaporized droplet in chamber 130, the primary power production is during this outward expansion.

Figure 13:
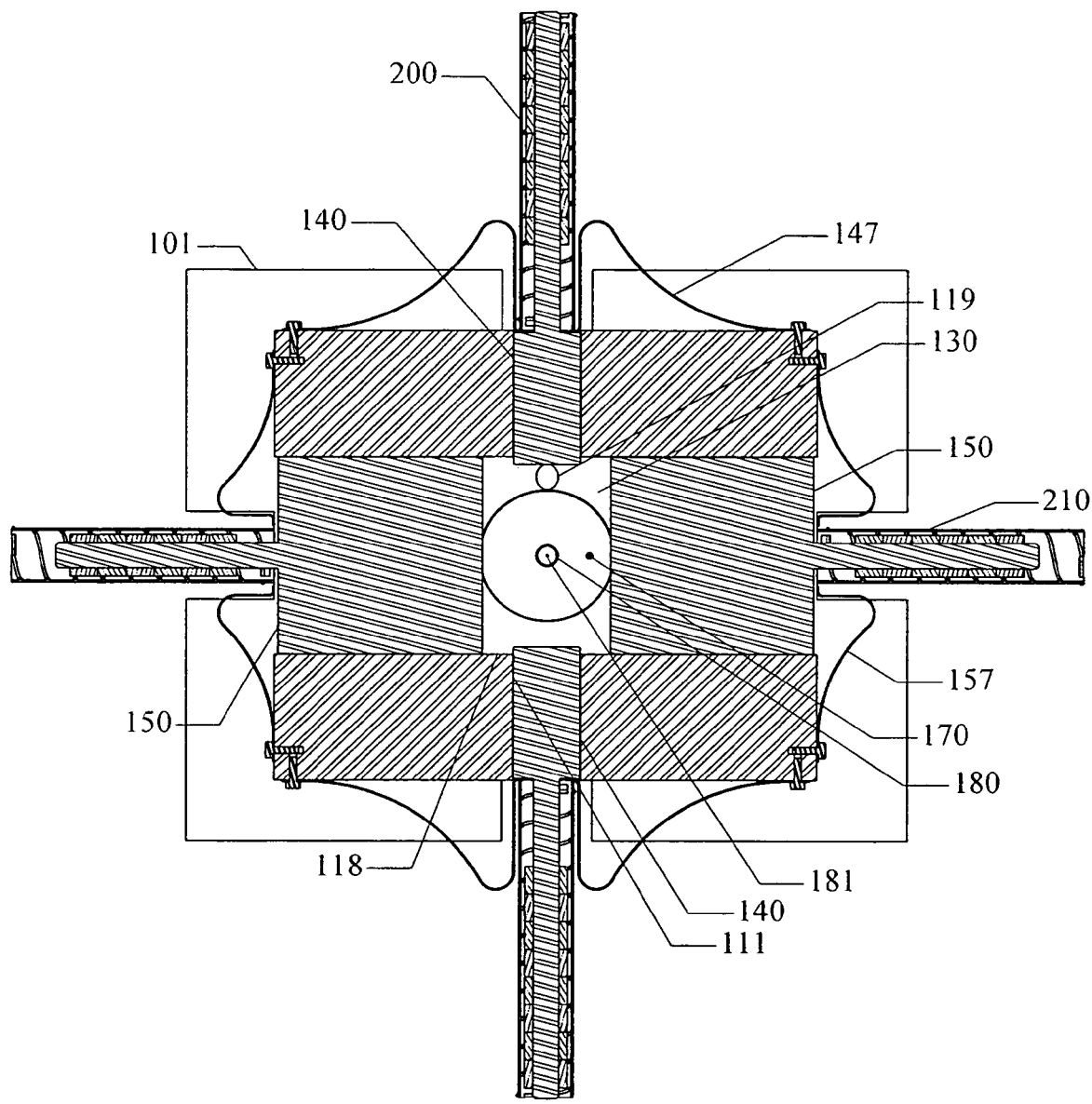
FIG. 13 is a transverse cross-sectional view corresponding to FIG. 11, but with the pistons fully displaced by the expansion of water vapor within the engine.
Figure 14:
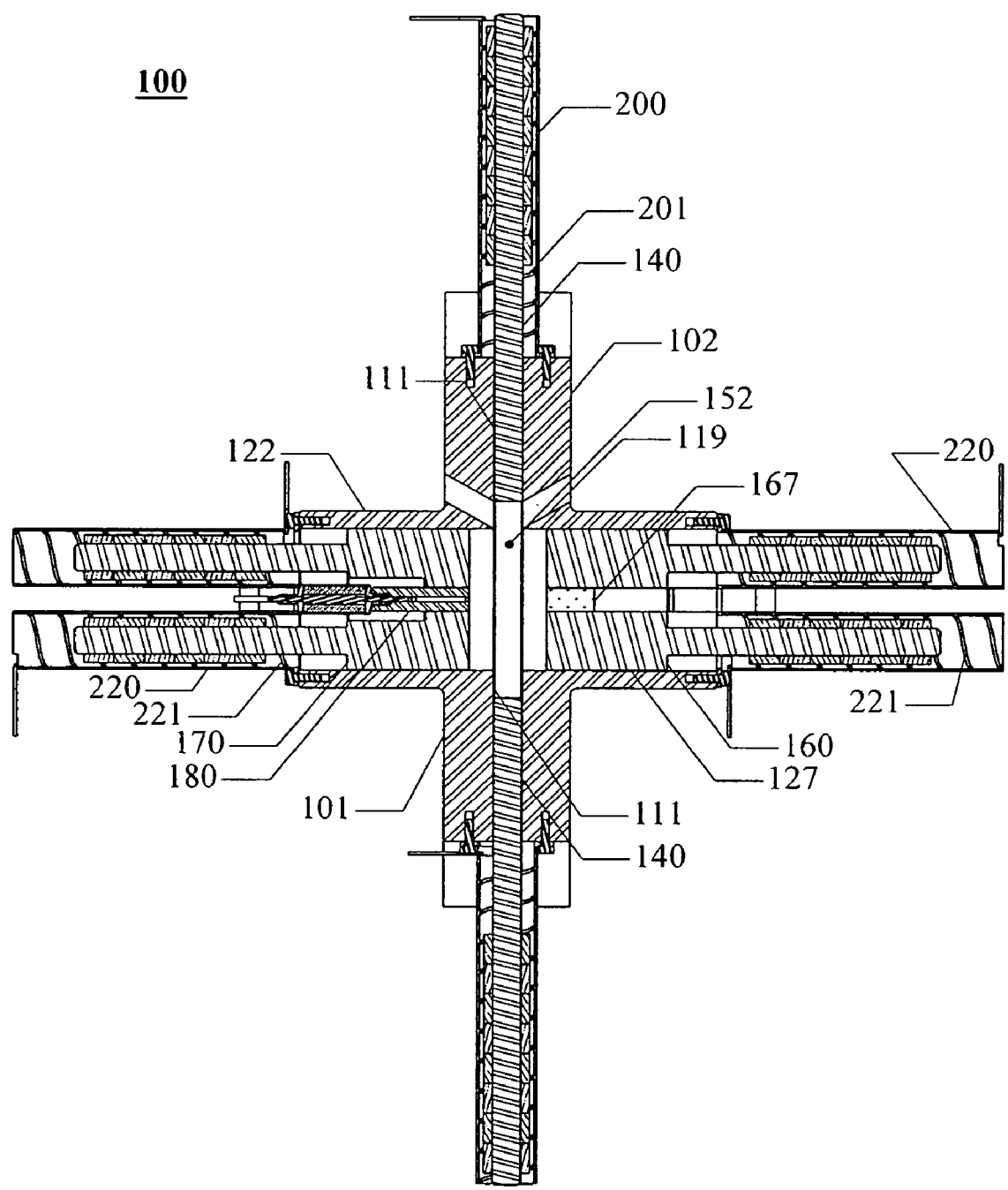
FIG. 14 is a transverse cross-sectional view corresponding to FIG. 12, but with the pistons fully displaced by the expansion of water vapor within the engine.

The outward motion of the pistons 140, 150, 160, and 170 is limited both through increased forces in their respective piston return springs 147, 157, and 168 and by counter electromotive forces induced by the generated currents in the respective windings 201, 211, and 221. The extreme outward positions of the pistons are shown in FIGS. 13 and 14. Referring to FIGS. 13 and 14, when the upper small piston 140 has moved sufficiently from its starting position, the exhaust vent 119 is uncovered. At that time and continuing until the upper small piston has reciprocated back sufficiently to recover the vent, the water vapor in the chamber 130 is exhausted.

The return forces on the pistons are due to the urging of the return springs 147, 157, and 168. If the linear generator circuits are left connected to the power collector system at this point, additional power can be generated, but with the result that the return motion of the pistons is resisted by counter electromotive forces generated by the movement of the magnets of the pistons past the windings of the coils. It should be noted that the velocities which can be generated by the return springs are much lower than those produced by the vapor expansion phase of the piston motion. For this reason, as well as the need to control the exhausting of the water vapor following extraction of its energy by the power strokes of the pistons, all of the windings are disconnected for the return strokes of the pistons except for the winding 201 for the upper piston shown in FIGS. 11 through 15. By leaving the winding 201 for the upper piston assembly 140 connected during at least part of the return stroke of the piston under urging of its return springs 147, the exhaust vent 119 can be kept open sufficiently long that an adequate degree of water vapor exhausting can be achieved. A certain amount of power can be collected from this return phase for the upper small piston, but it is much lower than that of the outward power stroke of the piston. FIG. 15 shows the upper piston 140 being retarded in its return while the other pistons have already achieved their initial starting positions corresponding to FIGS. 11 and 12.

Analytical studies have shown that the losses of pressure due to vapor escape between the pistons 140, 150, 160, and 170 and their respective passages 111, 118, and 127 are not excessive, largely due to the rapid outward movement of the pistons under the intense vapor pressures achieved with the rapid vaporization of the water droplet.

The first alternative injector 300 for the engine 100 operates in the following manner. The initial state of injector 300 is shown in FIG. 20. To initiate the injection cycle for the injector 300, first the air injector solenoid 310 is energized so that the plunger 311 of the air injector solenoid moves downwardly as shown in FIG. 21. The downward movement of plunger 311 blocks the entry and/or exit of air through radial hole 313 and compresses the air in the air passage 312 and hole 314. This compressed air is thus caused to pass through projecting air insertion tube 315 so that an injected air bubble 320 is introduced into the water-filled chamber 302 of the injector 300.

Following the creation of the bubble 320 shown in FIG. 21, the next step requires that the solenoid 184 operating the plunger 189 be activated so that a portion of the water 321 contained within chamber 302 and containing bubble 320 is forcibly ejected from chamber 302 by way of nozzle 301. The position of the two solenoid plungers 311 and 189 for this condition are shown in FIG. 22. The resultant mass of the ejected water with its entrained bubble forms a nearly spherical droplet 330 with a centrally located air bubble 331 under the action of surface tension, as shown in FIG. 22.

This droplet 330 with its central bubble 331 is then acted upon by the solar beam 88, resulting in its vaporization at an extremely high rate. The presence of the central bubble 331 causes intense shock waves to occur in the chamber in response to expansions and contractions of the bubble 331 at very high rates, further enhancing the release of energy by the vaporized water droplet 330. This increased release of energy results in more energetic motion of the pistons 140, 150, 160, and 170 of the engine 100, thereby permitting higher energy output by the engine.

The second alternative injector 400, shown in FIGS. 23 and 24, for the engine 100 operates in the following manner. Coolant is continually circulated through the system so that the cooling cone is held at a desired temperature, for example approximately 100° F. The desired temperature is achieved as a result of the expansion and attendant heat absorption of the coolant in the groove 412. When the plunger 189 of the solenoid 184 is actuated to cause the ejection of water from the chamber 402 by way of the nozzle 401, the resultant water droplet 415 is caused to form into a roughly spherical shape under surface tension forces. As the ejected water droplet 415 passes through the mouth of the cooling cone 409, it loses considerable heat to the cooling cone by means of radiative heat transfer. As a consequence, the water droplet 415 forms a frozen shell 417 which encapsulates a liquid core 416 of water. This partially frozen droplet 415 is then vaporized by the incident solar beam 88 when the shutter 69 admits the beam into the engine 100. The frozen shell 417 of the droplet 415 very briefly retains the pressure of the vaporizing droplet somewhat so that consequently higher pressures are produced in the chamber 130 than would otherwise be the case for a purely liquid droplet. The resultant higher pressures developed with injector 400 result in a higher energy production for the engine 100 than would be the case for a purely liquid injected droplet.

Advantages of the Invention

The solar heat engine system 10 of the present invention offers numerous advantages over other systems previously used for power generation purposes. In particular, the solar heat engine system 10 offers an efficient, simple system for the economical production of electrical energy. The positioning system of the self-actuated bearings 24 for the heliostats 20 is simple, robust, reliable, and inexpensive. Additionally, the positioning system is able to deliver high levels of positioning accuracy because of the small size of the increments of its motion. Another advantage of the positioning system is that it offers a high holding force with only minimal power requirements.

The rotary shutter system 68 for the solar heat engine system minimizes the buildup of unwanted heat in the engine 100 during the period when the engine cycle does not require the addition of further heat. This device thereby permits the use of more affordable materials and prolongs the life of the engine by avoiding the buildup of excess heat.

The simple, opposed construction of the engine 100 confers several important advantages on the overall solar heat engine system 10. Because the areas and masses and reactive electrodynamic loads of the opposed pistons are substantially the same during the high velocity vapor expansion portion of the engine cycle, the vibrations of the engine are very low. The only imbalance of the engine occurs during the exhaust portion of the engine cycle, and that imbalance is limited to a difference of velocity of the smallest pistons of the engine.

The linear movement of the pistons is not accompanied by side loadings on the pistons, so that the friction of the pistons is markedly reduced, as is their wear rate. The operation of the pistons is without seals, which is possible due to the very high rate of pressure buildup during the droplet vaporization and the attendant high rate of piston movement prior to arrival of higher pressures at the peripheries of the pistons. Because very small piston clearances with the passages for the pistons are used, efficiency losses due to blowby are minimized. To a very large extent, this is due to the presence of much higher pressures acting on the central portions of the active faces of the pistons than on the peripheries of their active faces. Since the engine operates without seals, the typically very high losses to friction from the rubbing of seals are avoided.

The engine 100 has a minimal number of moving parts and achieves its outputs directly through the use of the linear electrical generators having their active elements rigidly coupled to the pistons. Only one piston has an injector, and that injector is of very simple, reliable construction.

Because of its general simplicity, minimal number of moving parts, and the absence of side loadings on the pistons, the engine of the present invention is reliable and efficient. The simplicity of the construction results in fabrication savings, as well as maintenance savings.

As will be well understood by those skilled in the art, certain modifications can be made to the present system without departing from the spirit of the invention. For instance, conventional servo motors can be used to position the adjustable heliostats of the solar collector subsystem. Likewise, the optics of the solar collector subsystem can be modified by using a somewhat different arrangement to achieve the desired solar beam concentrations. For instance, another concentrator lens could be added between lens 50 and the engine mounting box 60 to further concentrate the beam incident on the cavity of the heat engine. In addition, a hollow compound parabolic type concentrator could be utilized, instead of a convex lens, for final concentration. The infrared and visible portions of the spectrum of the solar beam can be separated by interposing a flat mirror material transparent to visible light but reflective to infrared between the heliostats 20 and the parabolic mirror 40 so that only the more usable infrared energy is directed to the engine, while the visible portion of the spectrum can be directed to photovoltaic cells. This approach will lead to an increase in overall system efficiency. Other types of shutter assemblies can be utilized without departing from the spirit of the invention.

What is claimed:

1. A solar generator system comprising:
   (a) a solar collector subsystem having
      (i) a heliostat mirror,
      (ii) a parabolic mirror, and
      (iii) a concentrator lens or a compound parabolic concentrator; and
   (b) a heat engine having
      (i) a chamber; and
      (ii) a plurality of axially reciprocable opposed piston pairs, each piston having a surface facing the chamber, wherein one piston has a window to admit a concentrated solar beam from the solar collector subsystem and one piston includes an injector that injects a fluid droplet into the chamber.

2. The solar generator system of claim 1, further comprising an electric generator associated with each piston.

3. The solar generator system of claim 1, wherein the heliostat mirror is rotates about a vertical axis and a horizontal axis parallel to a heliostat mirror reflective face.

4. The solar generator system of claim 3, wherein the heliostat mirror is rotated using a self-actuating roller bearing.

5. The solar generator system of claim 3 having multiple identical heliostat mirrors positioned to reflect incident sunlight to the parabolic mirror.

6. The solar generator system of claim 1, further comprising a shutter assembly having a selectably open/closed slot, wherein the open slot is aligned to admit the concentrated solar beam through the open slot and into the piston window of the heat engine and the closed slot reflects the concentrated solar beam away from the heat engine.

7. The solar generator system of claim 1, wherein the chamber is intersected by passages for each of the opposed piston pairs.

8. The solar generator system of claim 1, wherein each piston reciprocates between an inner position and an outer position, whenever the piston is in the inner position a face of the piston is closer to the center of the heat engine than when the piston is in the outer position.

9. The solar generator system of claim 8, further comprising an exhaust vent, wherein the exhaust vent is open whenever at least one pair of pistons are in the outer position.

10. The solar generator system of claim 1, each piston of an opposed piston pair has a substantially identical size and mass to the other piston of the opposed pair.

11. The solar generator system of claim 1, wherein the fluid droplet includes water.

12. The solar generator system of claim 9, the heat engine further comprising a return means for returning the pistons from the outer position to the inner position.

13. A solar generator system comprising:
   (a) a solar collector subsystem having
      (i) a parabolic mirror,
      (ii) a plurality of heliostat mirrors positioned to reflect incident sunlight to the parabolic mirror, and
      (iii) a concentrator lens or a compound parabolic concentrator aligned to receive a reflected light beam from the parabolic mirror, the concentrator lens concentrating the reflected light beam to produce a concentrated solar beam; and
   (b) a heat engine having
      (i) a chamber,
      (ii) a plurality of axially reciprocable opposed piston pairs, each piston having an interior surface facing the chamber and responsive to pressure within the chamber, wherein one piston has a window to admit a concentrated solar beam from the solar collector subsystem and one piston includes an injector that injects a fluid droplet into the chamber,
      (iii) an electric generator associated with each piston such that electricity is generated whenever the pistons reciprocate between an inner position and an outer position;
      (iv) a return means for returning the pistons from the outer position to the inner position, and
      (v) an exhaust vent, wherein the exhaust vent opens whenever at least one pair of pistons are in the outer position; and (c) a shutter assembly having a selectably open/closed slot, wherein the open slot is aligned to admit the concentrated solar beam through the open slot and into the piston window of the heat engine and the closed slot reflects the concentrated solar beam away from the heat engine.

14. The solar generator system of claim 13, wherein the heliostat mirrors are automatically controlled to rotate about a vertical axis and a horizontal axis parallel to a heliostat mirror reflective face.

15. The solar generator system of claim 14, wherein the heliostat mirrors are rotated using a roller bearing having at least two selectably extensible and retractable piezoelectric pawls.

16. The solar generator system of claim 13, wherein the opening of the slot of the shutter assembly is synchronized with the injection of the fluid droplet.

17. The solar generator system of claim 13, wherein the electric generator is a linear generator.

18. A method for converting solar energy into electrical energy, the method comprising the steps:
  (a) directing incident solar radiation impinging on a plurality of heliostat mirrors to a parabolic mirror;
  (b) reflecting a light beam from the parabolic mirror to a concentrator lens or compound parabolic device;
  (c) concentrating the light beam to a concentrated beam;
  (d) directing the concentrated beam into a chamber of a heat engine having a plurality of axially opposed piston pairs, each piston having a surface facing the chamber, wherein one piston has a window to admit the concentrated beam into the chamber and one piston includes an injector;
  (e) injecting a droplet of working fluid into the chamber;
  (f) impinging the fluid droplet with the concentrated beam to vaporize the working fluid in the chamber;
  (g) reciprocating the pistons in response to the working fluid vapor; and
  (h) generating electricity by a set of generators associated with the reciprocating pistons.

19. The method of claim 18, further comprising the step of passing the concentrated beam through a selectably open/closed shutter wherein the open shutter is aligned with the piston window.

20. The method of claim 18, wherein the step of directing the concentrated beam is synchronized with the step of injecting a droplet of working fluid into the chamber.

* * * * *